United States Patent [19]
Page

[11] Patent Number: 5,799,612
[45] Date of Patent: Sep. 1, 1998

[54] COMPACT AND EFFICIENT PHOTOSYNTHETIC WATER FILTERS

[76] Inventor: Darren L. Page, 461 W. Holmes #368, Mesa, Ariz. 85210

[21] Appl. No.: 826,745

[22] Filed: Apr. 4, 1997

[51] Int. Cl.$^6$ ................................................. A01K 63/04
[52] U.S. Cl. ...................... 119/260; 210/416.2; 210/609; 210/169
[58] Field of Search ........................ 119/259, 260, 119/261, 262, 263, 264; 210/169, 416.2, 619, 150, 151, 602

[56] References Cited

U.S. PATENT DOCUMENTS

| | | | |
|---|---|---|---|
| 2,491,853 | 12/1949 | Feldman | 119/5 |
| 3,119,774 | 1/1964 | Arak | 210/169 |
| 3,557,753 | 1/1971 | Dantoni | 119/2 |
| 3,835,813 | 9/1974 | Katz | 119/5 |
| 3,839,198 | 10/1974 | Shelef | 210/14 |
| 3,848,567 | 11/1974 | Garber | 119/5 |
| 3,876,907 | 4/1975 | Widmayer | 315/208 |
| 3,882,634 | 5/1975 | Dedolph | 47/1.2 |
| 3,929,101 | 12/1975 | Katz | 119/5 |
| 3,930,335 | 1/1976 | Widmayer | 47/58 |
| 3,954,615 | 5/1976 | Shelef | 210/170 |
| 3,955,318 | 5/1976 | Hulls | 47/1.4 |
| 3,986,297 | 10/1976 | Ichimura | 47/1.4 |
| 4,005,546 | 2/1977 | Oswald | 47/1.4 |
| 4,076,619 | 2/1978 | Howery | 210/36 |
| 4,213,421 | 7/1980 | Droese | 119/3 |
| 4,267,038 | 5/1981 | Thompson | 210/602 |
| 4,324,068 | 4/1982 | Anthony | 47/1.4 |
| 4,333,263 | 6/1982 | Adey | 47/1.4 |
| 4,612,605 | 9/1986 | Mori | 362/32 |
| 4,612,726 | 9/1986 | Mori | 47/66 |
| 4,626,065 | 12/1986 | Mori | 350/96.15 |
| 4,669,817 | 6/1987 | Mori | 350/96.15 |
| 4,734,830 | 3/1988 | Cristian | 362/35 |
| 4,769,138 | 9/1988 | Frandsen | 210/150 |
| 4,851,112 | 7/1989 | Schlensker | 210/123 |
| 4,966,096 | 10/1990 | Adey | 119/3 |

(List continued on next page.)

OTHER PUBLICATIONS

Aquaricare & SurgArium Product Information Booklet, ©MMFI: Aquaricare Division PO Box 37531 Denver Co. 80237 Most pertinent pp.:1–6, 11–12, and order form p. 2; also attached copy of New Product Flyers pp. 1–4.

W.H. Adey and K. Loveland, Dynamic Aquaria: Building Living Ecosystems, Academic Press, Inc., San Diego, CA (1991) Copy of most pertinent pages: is provided, i.e., 231–247, 513–555, and color plate 5.

Y-K. Lee and S.J. Pirt, Energetics of Photosynthetic Algal Growths: Influence of Intermittent Illumination in short (40 s) Cycles, Journal of General Microbiology (1981), 124, 43–52.

*Primary Examiner*—Thomas Price

[57] ABSTRACT

A compact and energy efficient photosynthetic filter for purifying and conditioning aquarium water comprising a receptacle (108) for holding aquarium water, a growth element (202) having a growth surface (204) of sufficient texture for growing adherent photosynthetic organisms, and a non-continuous illumination device for providing photosynthetic-sufficient illumination to the photosynthetic organisms. A non-continuous illumination device in accordance with a preferred embodiment of the invention comprising a continuous light source mounted over a submerged, rotatably mounted, elongated, and substantially cylindrical growth element (202). Rotation of growth element (202) under the light source providing non-continuous illumination to adhered photosynthetic organisms. Rotation of the growth element is preferably powered by a motor (212) or turbine (600). The rotation rates of the growth element are controlled as to provide non-continuous illumination having alternating predetermined intervals of intense illumination and predetermined intervals of low illumination. The photosynthetic filters taught herein provide for greater than 66% reductions in size and even greater reductions in the lighting requirements as compared to the photosynthetic filters taught heretofore. Further, significant improvements to nutrient and light distribution to the photosynthetic organisms are attainable, thereby improving filtering efficacy.

24 Claims, 10 Drawing Sheets

U.S. PATENT DOCUMENTS

| | | | |
|---|---|---|---|
| 4,969,288 | 11/1990 | Mori | 47/17 |
| 4,995,980 | 2/1991 | Jaubert | 210/602 |
| 5,012,609 | 5/1991 | Ignatius | 47/58 |
| 5,054,424 | 10/1991 | Sy | 119/260 |
| 5,078,867 | 1/1992 | Danner | 210/169 |
| 5,097,795 | 3/1992 | Adey | 210/3 |
| 5,381,075 | 1/1995 | Jordan | 315/200 A |
| 5,423,978 | 6/1995 | Snyder | 210/151 |
| 5,527,456 | 6/1996 | Jensen | 210/170 |
| 5,536,398 | 7/1996 | Reinke | 119/260 |
| 5,573,669 | 11/1996 | Jensen | 210/602 |
| 5,647,983 | 7/1997 | Limcaco | 119/260 |

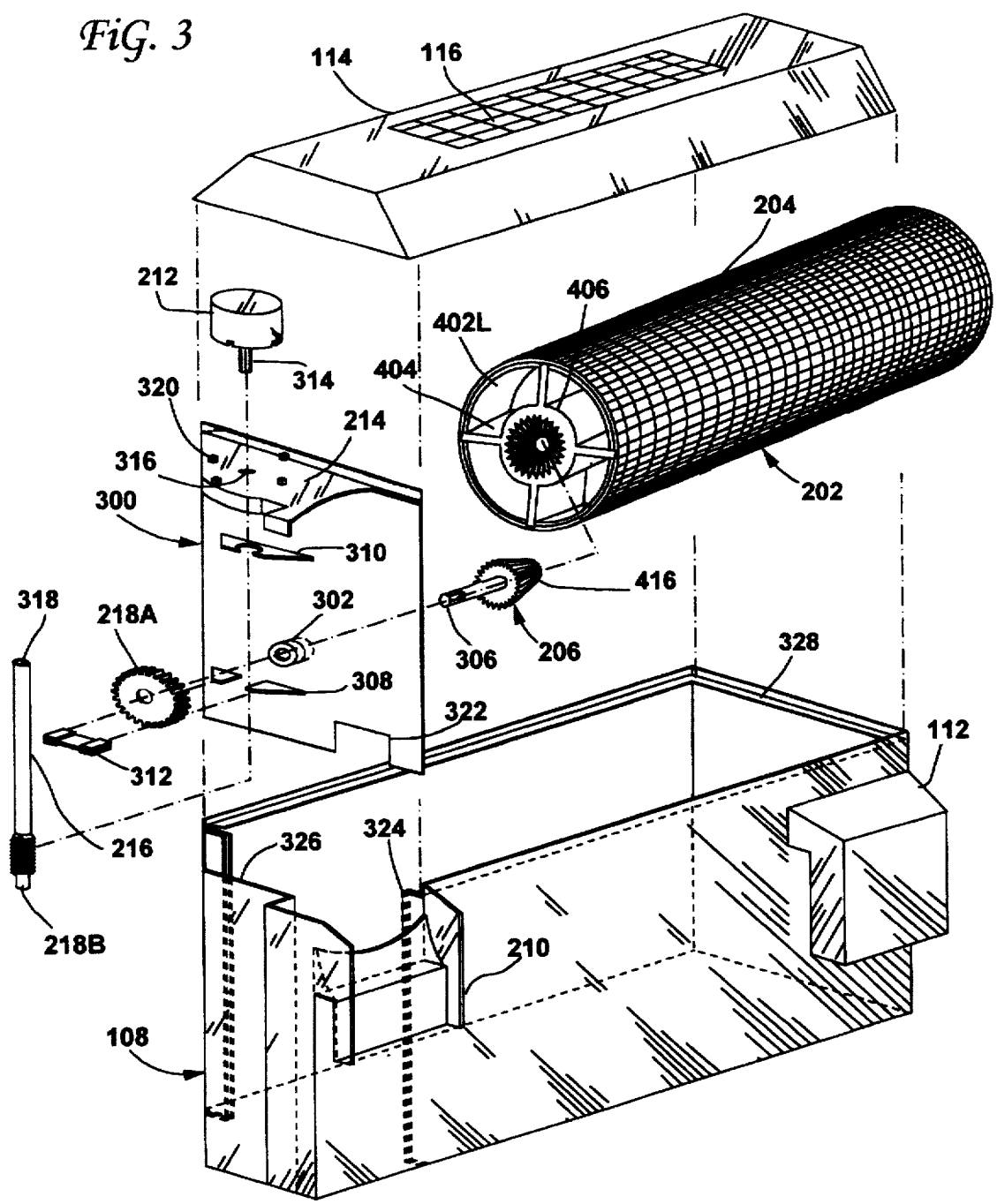

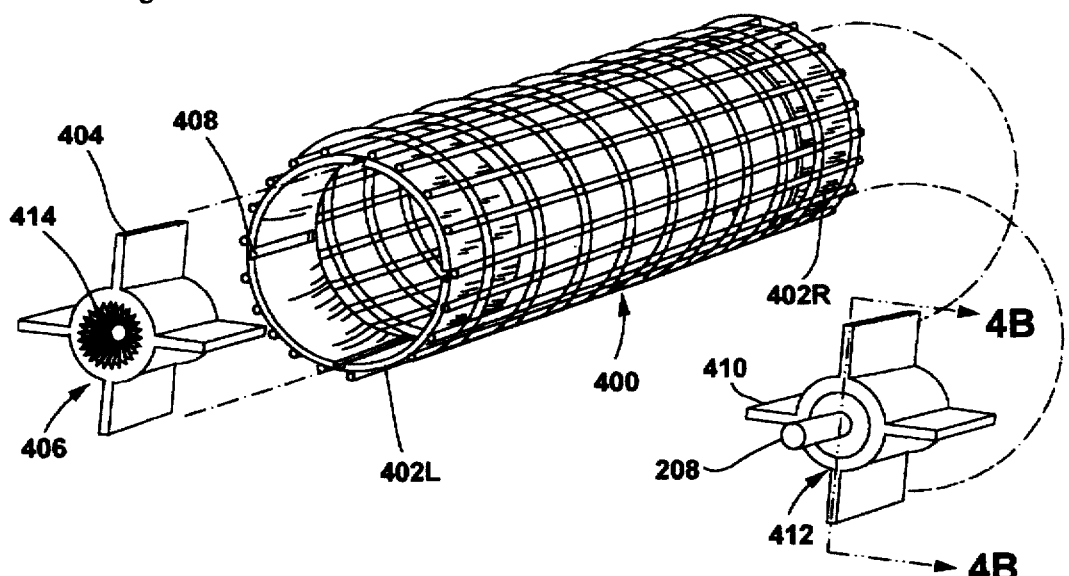
FIG. 4A
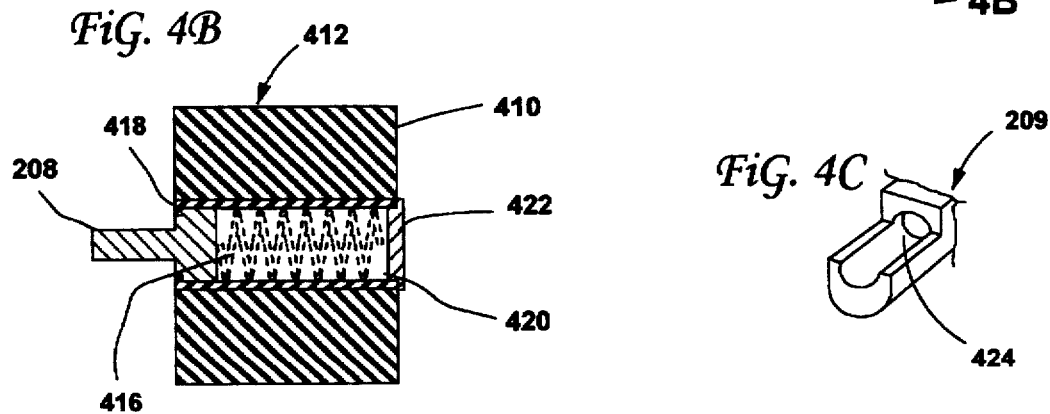
FIG. 4B
FIG. 4C
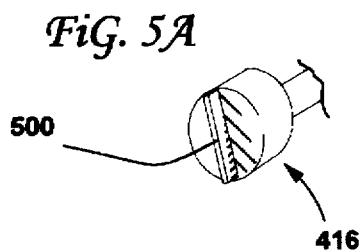
FIG. 5A
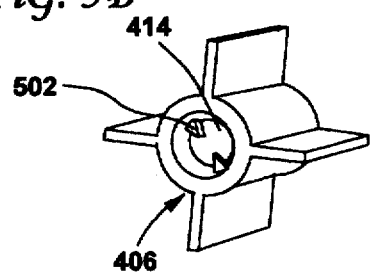
FIG. 5B

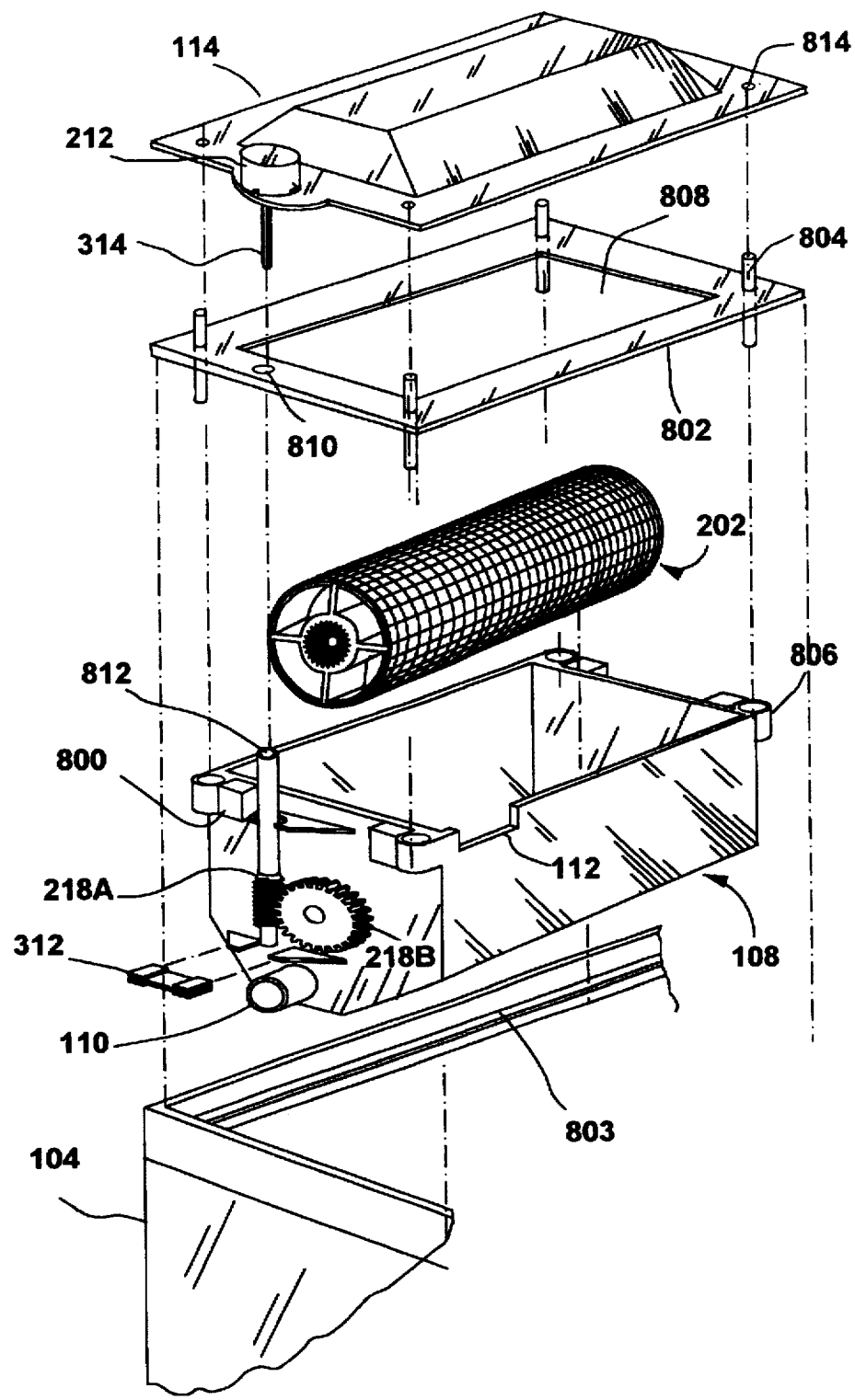

COMPACT AND EFFICIENT PHOTOSYNTHETIC WATER FILTERS

BACKGROUND—FIELD OF INVENTION

This invention relates to photosynthetic filters, and primarily photosynthetic filters and systems for purifying and conditioning aquarium water.

BACKGROUND—DISCUSSION OF PRIOR ART

A primary concern in the design and maintenance of living aquatic ecosystems, such as home aquariums, has been the maintenance of water quality. Waters within these enclosed ecosystems are continuously polluted by metabolic wastes excreted by animal residents, and by microbiological decay of animals, plants, and uneaten food matter. Further, aquatic life depletes the water of vital oxygen via aerobic respiration. In sum, these processes lead to an increase in toxins such as carbon dioxide, ammonia, nitrate, and nitrites, and a decrease in oxygen.

The build up of metabolic poisons and reduction in water oxygen can (a) result in noxious odors, (b) adversely effect the behavior of animal residents, inhibiting for example breeding behaviors, (b) lower the immune function of the animals, making them more prone to infections, (c) stunt the growth or reproductive development of residents, and/or (d) fatally poison residents. Consequently, water quality directly impacts the enjoyment attainable from the aquarium, as well as, the health of aquatic life and ultimately the costs of maintaining the aquarium.

There are basically two methods used to solve the problems associated with polluted aquarium water. First, the water can be continuously or intermittently replaced with fresh unpolluted water such that toxins are flushed from the system. Second, the water can be re-oxygenated and filtered to remove toxins. The problem with the first is that natural purified sources of water are usually not readily or economically available. This is especially the case with salt water aquariums as most people do not live near an ocean. Further, in most instances local water is not directly utilizable due to pH, hardness, and/or particulate and chlorine contents. Therefore, filtering is a necessity in virtually all aquarium systems. However, filtering has also been less than ideal and is typically supplemented with relatively frequent partial water changes.

The most commonly utilized biological filter in aquarium systems is the bacterial filter. In this filter, water flows over a bacterial laden substrate of fibrous wool-like polymer masses, gravel, sintered glass, or expanded clay granules, among others. In general, the higher the filter surface area, the more bacteria immobilized in the filter bed, and the more metabolites removed per unit volume water per unit time. Several different bacterial species participate in bacterial filtration by performing various metabolic actions upon the water pollutants. Many utilize organic materials and oxygen converting them to bacterial biomass, carbon dioxide, and ammonia. Others have the ability to convert ammonia, by using oxygen, into nitrate and nitrite. And others, under strict anaerobic conditions can 'ideally' complete the nitrogen cycle by converting nitrate to nitrite, to nitric oxide, to nitrous oxide, and finally to nitrogen and oxygen gases. However, anaerobic bacterial denitrification processes are relatively inefficient, strictly dependent on anaerobic conditions, and do not reduce carbon dioxide levels. Further, anaerobic conditions cause other bacteria to generate noxious and toxic compounds.

Other inefficiencies with bacterial filters have also prevented them from being ideal for water treatment. First, the build up of bacterial biomass is difficult to remove, making it an inefficient and ineffective method for removing organic and inorganic mass from the ecosystem. Second, several toxins such as nitrite, phosphorous, and heavy metal compounds are not efficiently removed by bacterial filters. Consequently, purely bacterial based filtering systems are typically supplemented with a variety of chemical filtering mechanisms to assist in the removal of toxins. These may include activated carbon and/or protein skimmers to directly remove organic molecules, nitrogen absorbing material to remove nitrogenous compounds, and even electrode based devices for electrochemically converting nitrogenous compounds to less toxic forms. All of these approaches add complexity and bulk, a degree of bio-ecological instability, and significant time and money costs for maintenance and operation.

For these reasons, several of those in the art have attempted to naturally 'complete' aquatic ecosystems via the combination of bacterial filters with photosynthetic filters. The latter incorporating photosynthetic organisms such as plants, algae, and photosynthetic bacteria, for completing the nitrogen and phosphate cycles, and for reoxygenating water. Others advocate algal photosynthetic filters as replacements to bacterial filters. However, the photosynthetic filters and systems proposed heretofore do not effectively purify and oxygenate aquarium water and/or have been space and energy inefficient, and difficult and costly to maintain. These and other problems and disadvantages of the prior art are specifically summarized below.

PRIOR ART: PHOTOSYNTHETIC FILTRATION SYSTEMS

U.S. Pat. No. 3,557,753, issued on Jan. 26, 1971, to Joseph L. Dantoni, describes an aquarium filter system contained within an aquarium. The filter system is formed of a vertically layered filter set including a layer of living algae and living plants, a layer of pH controlling calcite, and a lower layer of fiber wool having anaerobic microbes. The filter layers are supported on a perforated plate. Water is circulated through the aquarium and the three filter layers via a pump. A heating and cooling means are also included.

There are several major problems and disadvantages with this teaching. First, the plant/algal growth surface is flat, requiring large dimensions, and demanding high light intensities and high energy usage for standard illumination. Third, the photosynthetic filter portion is located at the bottom of the aquarium, making it even more inefficient in regards to obtaining adequate illumination, as surface illumination varies inversely as the square of the distance from the light source. Fourth, the layered filtering system described imposes that all the filter components fail simultaneously, i.e., when one clogs, flow ceases through all of the filter components. Fifth, the location of the filter and the layered arrangement make it difficult and time consuming to harvest algae and to clean the microbial filter, as water and inhabitants of the tank must be removed. Sixth, the anaerobic microbial filter proposed can generate compounds toxic to animals.

U.S. Pat. No. 3,929,101, issued on Dec. 30, 1975, to L. N. Katz, describes a balanced system for purifying aquatic media comprising biological (bacterial) filtration, mechanical filtration, and algae propagation. The bacterial filtration is performed by an under-gravel filter and porous aggregate material within the under-gravel filter. Mechanical filtration is carried out by media horizontally layered above an algae growth chamber. The algae growth chamber being a reflective walled chamber having a light source in the center and filled with clear glass spheres.

The disadvantages and limitations of this system render the photosynthetic filter ineffective and potentially harmful to tank inhabitants. First, the inclusion of porous aggregates under the under-gravel filter may increase the surface area for bacterial adhesion but also restricts water flow and distribution through the under-gravel filter and other filters. Second, the layering of the mechanical filter substrate and carbon/resin materials above the algal chamber make the algal filter difficult to maintain. Third, the flow to the algal chamber is completely dependent on flow through the mechanical filter, which by its very nature easily clogs with particulates. This clogging decreases flow and induces major metabolic and growth limitations on the algal culture, and may induce algal death. Fourth, the design of the algal chamber assures its failure, as the many growth surfaces block each other from the light source. Consequently, its function deteriorates as quickly as algae grows on the submerged light source and the glass spheres local to the light source. Fifth, this configuration requires high numbers of spherical growth components making it difficult and time consuming to harvest algae and clean the system. Sixth, because the bulb is very close, and surrounded by water, waste heat is preferentially transferred to the water. Seventh, the continuous illumination of the algal growth chamber requires an excess of electricity and produces an excess of heat.

U.S. Pat. No. 3,848,567, issued on Nov. 19, 1974, to J. W. Garber, discloses a salt water aquarium including a transparent tank member supported by a base member. An air-water filter head is contained within the transparent tank member and communicates with the base member. A filter unit is contained within the base composed of coarse and fine media filtration chambers and an algae incubator.

The major problems and disadvantages of this teaching are as follows: (a) The growth of algae on a submerged transparent surface adjacent to the light source will completely block light from reaching the primary growth surface shown. (b) The enclosure of the lighting system within the base traps waste heat and causes heating of the water within the filter and the tank. (c) The parallel plate surfaces shown for growing algae are inefficient surfaces for the growth of algae because the plates are parallel to the light source and thus illumination of these surfaces is minimal. Thus, the primary growth surface is essentially only the flat stationary bottom of the chamber, which is shaded by the vertical fins. (d) To adequately illuminate all the surface areas shown would take substantial numbers of high intensity light sources. (e) The location of the filter unit within the base make it accessible only by a portal, and the series arrangement of flow through the filtering unit, make it prone to clogging and failure. These features make it difficult and time consuming to clean and maintain the filter system. (f) Continuous standard illumination of the algae is electrically and dimensionally inefficient, and generates excess heat.

U.S. Pat. No. 5,054,424, issued on Oct. 8, 1991, to L. K. Sy, describes an ecosystem created in an aquarium using a main tank for containing aquatic animals and a separate filter tank. The filter tank contains a carbon filter, a plant/algae and temperature control compartment, a bacteria filter, and an aerator compartment. Water is circulated between the main tank and the filter tank.

The limitations and disadvantages of this teaching include: (a) The extra tank needed for filtration is large and bulky. (b) The algal/plant growth area is a flat stationary surface and therefore requires large dimensions and high light intensities to continuously illuminate photosynthetic components. (c) The light source is very far from the algal growth surface requiring higher light intensities to adequately illuminate algae. (d) The bacterial/particulate filter is placed in series with the algal/plant filter such that failure of the particulate filter prevents flow from the algal filter to the main tank. (f) The standard continuous illumination used is electrically and dimensionally inefficient, and generate excess amounts of heat.

PRIOR ART: PHOTOSYNTHETIC FILTERS

U.S. Pat. No. 5,097,795, issued on Mar. 24, 1992, to W. H. Adey (hereafter Adey (1992)) describes an algal turf scrubber having a flat screen surface in the bottom of a tray shaped receptacle. The tray is moved in an oscillatory manner to simulate 'surge' action of water across the algae. As the receptacle fills with water pumped from the aquarium, the center of gravity of the receptacle changes about a pivot point, and the receptacle tilts forward and empties the water back into the tank. Other embodiments include oscillatory motor systems for moving the substrate in linear or circular oscillatory motions through the water, and for creating artificial 'surge' action. Similar embodiments of 'surge action' algal scrubbers are taught in Adey, W. H. and Loveland, K., Dynamic Aquaria: Building Living Ecosystems (1991), Academic Press, Inc., (hereafter, Adey (1991)), U.S. Pat. No. 4,966,096, issued on Oct. 30, 1990, to Adey (hereafter, Adey (1990)), and U.S. Pat. No. 4,333,263, issued on Jun. 8, 1982 to Adey (hereafter, Adey (1982)). There are several problems and disadvantages with this type of surge algal turf scrubber including:

(a) The flat growth surfaces used in all of the embodiments are dimensionally inefficient and bulky, i.e., the ratio of the algal growth surface area to the tray dimensions is low. Therefore, the described scrubbers are very space inefficient and especially inappropriate when space is limited, as is the case with in-home aquariums. (b) Further, the large dimensions of these scrubbers also require excessive continuous illumination to attain photosynthetic growth. This translates into high costs for the required high intensity bulbs, high electrical energy consumption, high generation of waste heat, and a significant bulk to scrubber size. (c) The oscillatory growth surface motions described significantly increase the required dimensions of the scrubber. In a primary embodiment in Adey (1992), for example, the scrubber height must be made as to contain the receptacle in its nearly horizontal position and in its tilted position. This required height can become quite significant for long receptacle lengths (L), where the height of the receptacle required for allowing tilting of the receptacle is approximately equal to the product of $L\sin\theta$, as the receptacle in its horizontal and tilted position approximately form an isosceles triangle with apex angle $\theta$. For the exemplified embodiment in Adey (1992) of a 36 inch receptacle over the taught 30 degree tilt, the required height is approximately 1.5 feet. This alone significantly increases the bulk of the scrubber to sizes impractical for home aquaria. Further, additional height is needed for providing space between the receptacle and the lighting system, as well as for the height of the lighting system itself. The alternate oscillatory embodiments described by Adey (1991 and 1992) also increase the required dimensions by the amplitude of the oscillations. (c) Tilting trays or buckets are notoriously noisy and produce intermittent clanks, thumps or splashing as they fall back and forth about the pivot. Intermittent noises of this type can be annoying in the home, especially at night when Adey (1992) teaches the scrubber to be in operation. (d) The oscillatory movement embodiments taught by Adey (1991 and 1992) rely upon conversion arm systems for changing rotational motion to linear oscillatory motions. These conversions in motion are known to be relatively inefficient and mechanically stress the motor, the rigid arm, and linkage components described. The loss of energy in such conversions is typically manifested as oscillatory noise and heat from the motor and linkages, as well as heavy wear on the motor and linkage components. (e) Oscillatory surge action of water is usually quite noisy as water typically reverses direction, and energy is dissipated as noise. (f) Adey teaches intermittent lighting only for turning the scrubbers on for 12–18 hours per day (Adey 1991, page 236). Over darkness periods of 6–12 hours photosynthetic organisms will revert to aerobic respiration and photosynthetic filtering ceases.

U.S. Pat. No. 5,536,398, issued on Jul. 16, 1996, to M. A. Reinke (Reinke 1996), describes an algal filter that purifies and oxygenates aquarium water comprised of an elongated box with an inlet and an outlet at opposing ends. Algae is grown on trays resting on supports within the box. Baffles are situated above the trays in alternation with supports to alternately direct the water upward and downward through the trays along the length of the filter to produce turbulence. A lid placed atop the box holds artificial lights that illuminate the algae growing on the trays. A pump circulates water through the elongated box to an aquarium. Similar, algal filters are also apparently currently sold by the Assignee "Aquaricare" of Denver Co. for mounting on the edge or side of an aquarium and including a post-scrubber water chamber/sediment trap. Also, similar, algal filters were previously manufactured for sale by M. A. Reinke under the names "Mark's Marine Fish, Inc." or "MFI", "Aquaricare Division", of Denver Co. However, these latter filters did not include the baffles of the teachings of Reinke (1996) and apparently had a single growth tray. Apparently these filters had poor filtration due to a lack of turbulence and due to the development of un-idirectional, linear flow over the excessively long growth surfaces. This type of flow causes algae to lay preferentially to one side, shading neighboring algae under it.

The primary limitations and disadvantages of these teaching include: (a) Standard illumination for providing photosynthesis of algae upon the dimensionally large growth trays, necessitates relatively large lighting systems, comprising several bulbs, and thus requiring relatively large amounts of electricity, and generating an excess of waste heat. Further, the taught, latticed, planar growth surfaces translate into bulky, space wasting dimensions, larger lighting systems, and excessively high costs to make and use the scrubber. A majority of the lattice structure of the growth surfaces described are not able to be efficiently illuminated as they are parallel to the light source, and have many deep shaded structures. (b) The large, elongated growth surfaces require relatively large pumps and inefficient baffles to provide turbulent flow, (c) The turbulence baffles used are placed between the growth trays and the lights. This arrangement blocks the growth surface from the lights. Even if the material for the baffles is clear, they will quickly become covered with algae and become opaque. This is problematic for several reasons. First, algal growth on the relatively smooth surface of the baffles shown will be poor as compared to algal growth on a porous substrate, such as a screen. Thus the sub-optimal growth on the baffles will decrease the efficiency of the scrubber by blocking light to the primary growth surface. Second, the ever increasing blocking of algal growth on the primary growth surface, by algal growth on the baffles, stresses the primary algae growth. Algae stressed in this manner will typically release potentially toxic compounds and may even eventually die, both of which will pollute the water. Third, any significant growth of algae on the baffles will block the slits in the baffles, and although this will cause changing flow patterns over days of algal growth, these long-term extended changes are not completely beneficial. The local algal growth rates within the tray will be a function of the local illumination level and the local nutrient level, the latter dependent on the local convective mass transport coefficient, and thus the turbulence at that region. Therefore, although these long-term changes in flow patterns may provide new high growth areas, they will as certainly starve previously high growth areas. Thus, these changes can cause more harm than good, as dead and dying algae release impurities back into the water. Fourth, algal growth on the baffles translates into more maintenance time to remove/harvest growths from these additional complex surfaces. (d) The perforated tray and supports utilized have many small apertures and relatively long tortuous paths through which water must flow to maintain circulation. These areas will naturally accumulate algal growths, dead algae, and debris from the water; the decay of dead algae releasing organic and inorganic pollutants back into the water. Further, these grated chambers are difficult to clean as they have many small holes, and to clean them requires removing the growth surfaces, baffles and other components. This translates into significantly increased maintenance requirements.

PRIOR ART: ROTATING BACTERIAL FILTERS

Partially submerged rotating bacterial filter bodies are often used in industrial and municipal waste water treatment facilities to improve the metabolism of immobilized aerobic bacteria Rotation of the filter bodies alternately submerges and exposes portions of the filter bodies to the oxygen in air. As the aerobic respiration of bacteria is typically oxygen limited in water, this intermittent exposure of bacteria to the oxygen in air significantly increases the metabolic utilization of water pollutants. Miniaturized versions have also been taught for use in home aquaria. U.S. Pat. No. 5,423,978, issued on Jun. 13, 1995, to W. P. Snyder et al. describes a rotatably mounted filter body, mounted partially submerged and partially exposed to air. Water flow is used to impart rotation to the filter body, alternately submerging and exposing portions of the filter body to the oxygen in air. Increased oxygenation of the filter body fosters the growth of aerobic bacteria and increased conversion rates of ammonia to nitrate, and nitrate to nitrite. Similar, wheel filter bodies are taught in U.S. Pat. No. 5,078,867, issued on Jan. 7, 1992, to M. Danner.

As these filters utilizes aerobic bacterial filtration, ammonia is merely converted to the relatively less toxic nitrate and nitrite. These filters do not effectively remove several toxic pollutants including nitrite, phosphates, and heavy metals, among others. Further, aerobic bacterial respiration utilizes oxygen needed by animals, and is inhibited by light. Also, this filter mechanism requires the filter to be exposed to oxygenated air, which increases the evaporation of water from the aquarium system, thereby increasing water hardness and requiring more frequent water changes. Additionally, the filter systems taught by Snyder et al.

(1995) and Danner (1992) would not be effective for the culture of photosynthetic organisms as no light source is provided, and would in practice, inhibit the function of the filter body as taught since the growth and metabolism of aerobic bacteria is inhibited by light.

In sum, the photosynthetic aquarium filters and systems heretofore known suffer from a number of disadvantages including they are dimensionally large, utilize standard continuous illumination of photosynthetic organisms for operation, require large numbers of energy consuming and heat producing lights, utilize noisy or light blocking methods of promoting water surge or turbulence, require large pumps to provide turbulence, have inefficient oscillatory movements of the growth surface, have shading surfaces and tortuous paths prone to clogging, have not been optimally interfaced with bacterial filters for enhancing water filtration, and have no means to control or optimize filtration rates.

OBJECTS AND ADVANTAGES

Accordingly, besides the objects and advantages of the photosynthetic filters described in my above patent, several objects and advantages of the present invention are:

(a) To provide a photosynthetic filter useful for purifying home aquaria, fish ponds, and the like.

(b) To provide a photosynthetic filter providing non-continuous illumination to photosynthetic organisms for stimulating photosynthesis.

(c) To provide a compact photosynthetic filter.

(d) To provide a photosynthetic filter having low generation of waste heat.

(e) To provide an energy efficient photosynthetic filter for growing photosynthetic organisms.

(f) To provide a photosynthetic filter requiring a minimal of light bulbs to operate.

(g) To provide a photosynthetic filter requiring low light intensities to operate.

(h) To provide a photosynthetic filter of small dimensions yet having a large surface area for adhering increased numbers of photosynthetic organisms.

(i) To provide a photosynthetic filter for efficiently removing impurities, such as ammonia, nitrates, nitrites, phosphorous, and heavy metals from water.

(j) To provide a photosynthetic filter providing high water quality for the maintenance of pollutant intolerant creatures.

(k) To provide a photosynthetic filter for adding oxygen to aquarium water.

(l) To provide a photosynthetic filter having quiet operation.

(m) To provide a photosynthetic filter not requiring noisy, space inefficient oscillatory motions of the growth surface (n) To provide a photosynthetic filter which is easy to clean and is not prone to clogging.

(o) To provide a photosynthetic filter having easily removable and cleanable growth surfaces that can be reused or easily replaced.

(p) To provide a photosynthetic filter easily integrated with bacteriological and particulate filters for amplifying purification efficacy.

(q) To provide a photosynthetic filter allowing a high animal-number-to-water-volume ratio to be maintained within an aquarium or fish pond.

(r) To provide a photosynthetic filter having mechanisms for regulating and optimizing the growth rate of photosynthetic organisms, and thus filtering and oxygen levels provided by the photosynthetic filter.

(s) To provide a photosynthetic filter having turbulent changing flows of water over the growth surface without the necessity of oscillating pivoting trays, linear oscillating trays, or baffles.

(t) To provide a photosynthetic filter allowing easy removal of mass from an aquarium or similar ecosystem (u) To provide a photosynthetic filter for reducing the frequency and magnitude of aquarium water changes.

(v) To provide a photosynthetic filter having little loss of water due to evaporation.

(w) To provide a photosynthetic filter for mounting within an aquarium and not requiring a separate receptacle.

Further objects and advantages are to provide photosynthetic filters and systems which are simple to assemble and install, simple and inexpensive to maintain, and inexpensive to manufacture. Still further features, objects, and advantages will become apparent to those skilled in the art from the detailed description of the invention which is presented by way of example and not as a limitation of the present invention.

SUMMARY OF THE INVENTION

Those in the art have appreciated the role of photosynthetic organisms for completing the carbon, nitrogen, oxygen, and phosphate cycles, within the earth's biosphere and in self-contained ecosystems. Further, those in the art have appreciated that photosynthetic activity is a function of nutrient exchange rates and illumination levels, with peak photosynthesis rates occurring at species specific levels. However, to date, photosynthetic based filtering systems have been inefficient and inadequate for size limited uses such as home aquariums, as they have been dimensionally large and bulky, and require excessive lighting.

The Applicant has discovered methods and apparatuses for providing non-continuous illumination to adherent photosynthetic organisms for significantly reducing apparatus dimensions, energy consumption, and costs of maintaining the growth of photosynthetic organisms, while significantly improving light and nutrient distribution to these organisms. Further, the Applicant has discovered that nutrient assimilation and oxygen production rates may be controlled by the character of the non-continuous illumination provided. Herein the Applicant teaches the use of these discoveries for constructing and using new efficient and compact photosynthetic growth systems for water filtration, and physical constructs and methods for integrating these new devices with bacterial filters to maximize overall filtering performance.

In a preferred embodiment, the invention is comprised of a receptacle and one or more photosynthetic growth elements horizontally extending between distal walls of the receptacle. The growth element is demountably and pivotably attached to the receptacle by shafts, allowing the growth element to rotate relative to the receptacle. A light-hood forming at least a portion of the top of the receptacle, positions a light source over the growth element such that rotation of the growth element provides a non-continuous illumination means for supporting the growth of photosynthetic organisms adhered to the growth element. A pumping means is used to circulate water between the receptacle and an aquarium. Rotation of the growth element is powered by a motor affixed to the receptacle, or alternately, by water flow impinging onto a turbine. Photosynthetic growth and metabolic rates may be regulated by controlling the rotation rates of the growth element. The ability to control photosynthetic rates, also allows the integration of oxygen ($O_2$) and/or pH sensors to automatically regulate and optimize pH, $O_2$, and pollutant filtering rates.

DRAWING FIGS. 1 TO 14

In the drawings, closely related figures have the same number but different alphabetic suffixes.

FIG. 3 is a partially exploded perspective view of the photosynthetic filter of FIG. 1.

FIG. 4A shows a partially exploded perspective view of a growth element support frame of the photosynthetic filter of the embodiment of FIGS. 1, 2A, and 3.

FIG. 4B is a sectional view of the free hub of FIG. 4A.

FIG. 4C is a perspective view of the free bearing of FIG. 2A.

FIG. 5A is a perspective view of an alternate drive head for the drive shaft of FIG. 3.

FIG. 5B is a perspective view of a drive hub for rotationally engaging the alternate drive head of FIG. 5A.

FIG. 8 is a partially exploded perspective view of a photosynthetic filter in accordance with another embodiment of the invention, wherein a photosynthetic filter is mounted within an aquarium.

DESCRIPTION OF THE INVENTION

Figure 1:
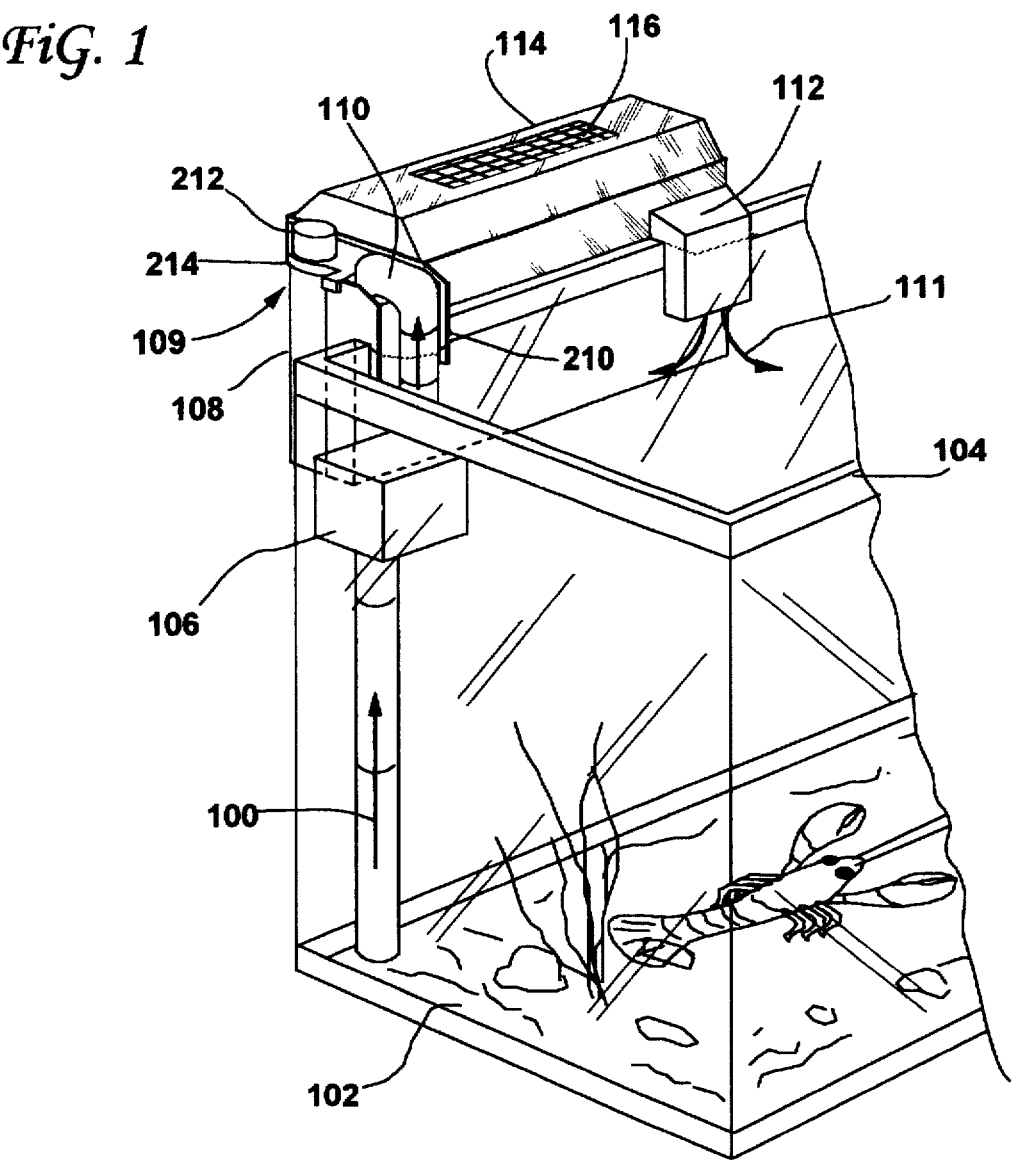
FIG. 1 is a perspective view of a photosynthetic filtration system in accordance with a preferred embodiment of the present invention.

The Applicant has discovered that non-continuous illumination, supporting photosynthesis of photosynthetic organisms adhered to a growth surface is obtainable by either (a) rotating a growth element under a small stationary light source, (b) by moving a small light source or lens, as to sweep illumination across a stationary growth element, or (c) by non-continuously powering a light source.

Herein the Applicant teaches the use of these discoveries for constructing and using new compact and energy efficient photosynthetic growth systems for adherent photosynthetic organisms, and their use for treating water of isolated aquatic ecosystems such as aquariums, indoor and outdoor ponds, flowing water terrariums, vivariums, and the like. However, the taught photosynthetic growth systems are also useful for scientific culture of adherent photosynthetic organisms, as well as culture of these organisms for feeding to aquatic animals and pets.

Non-continuous illumination as taught herein is defined as alternating illumination having (a) an interval of substantially intense illumination and (b) an interval of substantially lower illumination, wherein the illumination intensities and interval durations are selected as to support photosynthesis. 'Photosynthesis-sufficient' illumination is defined as illumination supporting photosynthesis, although the rate of photosynthesis may be limited by light. 'Light-sufficient illumination' is defined herein as illumination such that photosynthesis is not limited by light. Therefore, photosynthesis may be limited only by nutrient levels (i.e., pollutant levels).

The illumination intervals taught herein are on the order of seconds and related to the phenomena that intermittent illumination intervals of this order are useful for providing light-sufficient photosynthesis. This phenomena is described further in the following teachings, incorporated herein as reference: Lee, Y. K. et al., Journal of General Microbiology, 124:43–52 (1981) (Lee, 1981), and U.S. Pat. No. 3,955,318, issued on May 11, 1976, to J. R. Hulls (Hulls, 1976).

However, the teachings such as Lee (1981) and Hulls (1976) are not useful as compact photosynthetic filters for aquariums because of their large size, and need for extensive water flow and lighting requirements. Further, the intermittent illumination method taught in these references requires large concentrations of freely suspended, non-adherent, algae in the water to be purified. Suspensions of algae, especially at the concentrations taught, are harmful to many aquatic organisms, clog mechanical filters, and create a cloudy green broth which is visually unappealing.

The non-continuous illumination taught herein should not be confused with the intermittent illumination, such as that described by Adey (1991), in which the light source to the photosynthetic filter is turned off during the day and on during the night Intermittent illumination having dark periods of durations of approximately 20 minutes and greater will not provide photosynthetic-sufficient illumination and the algae will convert to aerobic respiration. Further, the non-continuous illumination taught herein should not be confused with high frequency microsecond or millisecond flashing of illumination often used to enhance photosynthesis. The various approaches for producing flashing illuminations for enhancing photosynthetic growth, and their disadvantages, are taught in U.S. Pat. No. 5,381,075, issued on Mar. 19, 1997, to J. P. Jordan, incorporated here as reference. These high frequency flashing approaches are used primarily to enhance photosynthesis, and little to no gains are made in regards to overall size, the numbers and sizes of bulbs required, and their power consumption and heat output. As such the industrial photosynthetic filters and growth systems such as described by Jordan (1997) are not useful for home aquarium filtration. However, a flashing light source may be utilized in the non-continuous lighting taught in the present invention for enhancing photosynthesis.

A photosynthetic filter is defined herein as a water filter and conditioner utilizing adherent photosynthetic organisms. A photosynthetic filter using primarily adherent aquatic algae and adherent photosynthetic bacteria for filtration is defined herein as an algal filter, algal scrubber, or algal turf scrubber. A photosynthetic filtration or filter system is defined herein as a water purification or filtration method or device having a photosynthetic filter combined with filters selected from the group of bacterial, mechanical, and chemical filters.

A photosynthetic filtration system in accordance with a preferred embodiment of the invention, is illustrated in FIG. 1. Water 100 is drawn from an under-gravel filter 102 contained within an aquarium tank 104 by a pump 106 and is directed to receptacle 108 of a photosynthetic filter 109 via an inlet tube 110. Water entering receptacle 108 is purified preferably by immobilized aquatic algae and aquatic photosynthetic bacteria (hereafter algae).

Other photosynthetic organisms useful for purifying water in context of this invention include aquatic plants, and terrestrial plants and mosses. Algae are most preferred because (a) their small sizes allows large populations to be adhered to relatively small growth surfaces, (b) they are resistant to shearing from the growth surfaces, and (c) they grow well in waters ranging greatly in terms of salinity, pH, water hardness, and pollutant levels. Further, algae need not be directly added to the growth surface as they are abundantly found in aquarium waters.

However, preferably the growth surfaces for use in the present invention are seeded with algae subsequent to manufacture so that filtering capacity is more quickly obtained. Surfaces may be seeded with algae by immersing them in waters having growing populations of algae, or by applying solutions of algae scrapings. Preferably, seeded growth surfaces are air dried to reduce water content, thereby increasing shelf-life and preventing putrefaction. Further, the growth surfaces may be baked at temperatures up to approximately 60° C. for more quickly drying algae and reducing water content thereby further extending shelf-life Water 111 is returned to the aquarium via an outlet port 112. Inlet port 210 and outlet port 112 form an overhang support for mounting receptacle 108 on the side of aquarium 104. Preferably, the water contacting components of the invention are primarily fabricated from the non-toxic plastics and epoxy resins currently used in art for the production of aquarium filtration units (e.g., polypropylene, polystyrene, polycarbonate, & polyethylene).

A lighthood 114 having a heat vent 116 forms a top for photosynthetic filter 109, thereby preventing water evaporation, and serving as a housing for a light source for photosynthesis. Reflective surfaces within the lighthood concentrate and restrict the light to growth element 202 (seen in FIG. 2). Preferably, fluorescent light sources are used for implementation of the invention as they have long lives, are energy efficient, and have relatively low heat outputs. Further, several types of fluorescent bulbs are available having emission spectrums preferred by photosynthetic organisms. Other artificial illumination sources useful include incandescent lamps, halogen lamps, and the like. Artificial light bulbs may be used in conjunction with or replaced with natural light, when for example, the filters are used with outdoor ponds. Additionally, natural light may be collected and 'piped' indoors to the lighthood using collectors and fiber optics, or collectors and light tubes such as those manufactured by Gordon (San Marcos, Calif.) and by SolaTube (Tempe, Ariz.).

The non-continuous illumination taught herein is preferably comprised of alternating, intense illumination intervals and low illumination intervals. Preferable levels of illumination for the intense illumination interval should be in the range of approximately 50 $\mu$einsteins/m$^2$-sec to 2000 $\mu$einsteins/m$^2$-sec. More preferred levels for use in the present invention are between 50 and 1000 $\mu$einsteins/m$^2$-sec, and most preferred levels between 300 and 800 $\mu$einsteins/m$^2$-sec. Illumination levels for the low illumination interval are preferably between approximately 0% and 90% of the maximum intense illumination level employed, more preferably between 0%–50%, and most preferably between 0% and 20% of this maximum illumination.

Figure 2A:
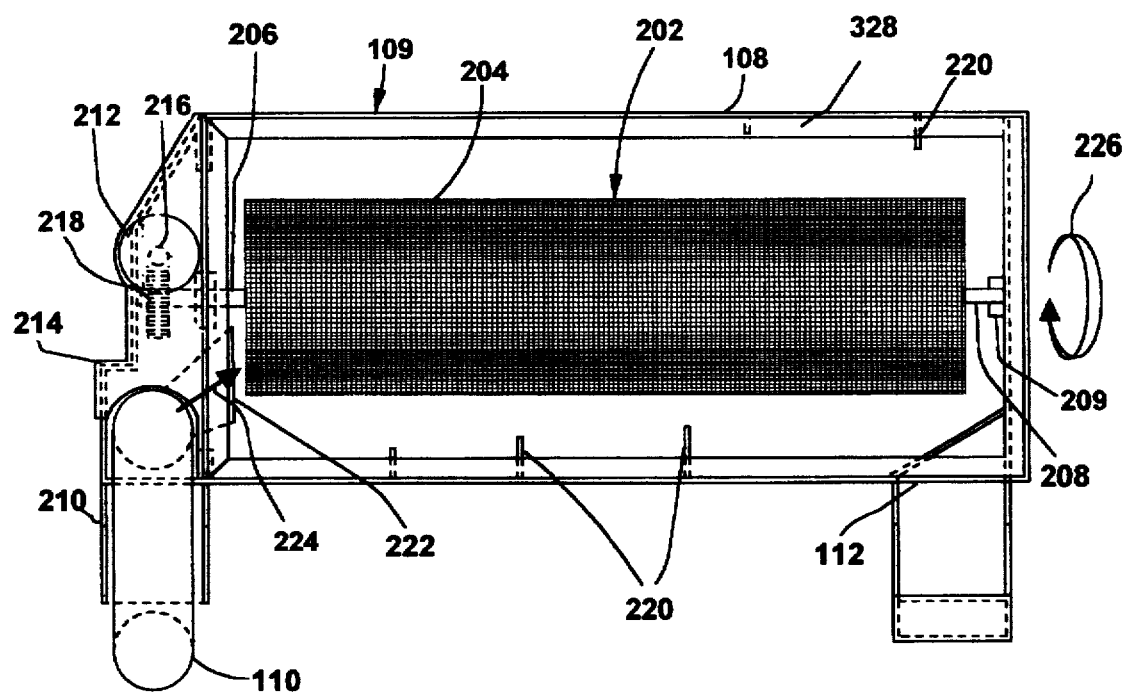
FIG. 2A is a top plan view of the photosynthetic filter, with the lighthood portion removed, of the photosynthetic filter system of FIG. 1.
Figure 2B:
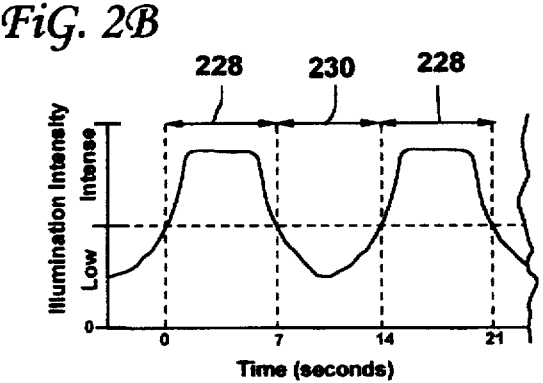
FIG. 2B is a graph showing a preferred non-continuous illumination profile provided by the embodiment of FIG. 2A having a continuous light source.
Figure 2C:
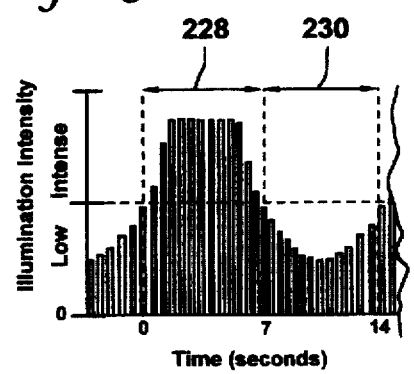
FIG. 2C is a graph showing a preferred non-continuous illumination profile provided by the embodiment of FIG. 2A having a flashing light source.

FIG. 2B exemplifies a portion of a representative illumination profile experienced by a photosynthetic organism on the surface of a rotating prolate growth element of a preferred embodiment of the present invention. The exemplified non-continuous illumination of the photosynthetic organism is comprised of alternating intervals having, seven second intense illumination intervals 228, over which illumination intensity is between 50 $\mu$einsteins/m$^2$-sec to 2000 $\mu$einsteins/m$^2$-sec, and seven second low intensity intervals 230, over which illumination intensity is between approximately 25% and 50% of the peak illumination value of the high intensity interval. Referring, to FIG. 2C the light source for illuminating the rotating growth element may be continuous or flashing, and thus the exemplified non-continuous illumination profile of FIG. 2B may also be obtained with a flashing light source.

Referring to FIGS. 2A and 3, receptacle 108 contains a pivotably mounted, substantially hollow, prolate growth element 202, having a substantially cylindrical cross-section, and having a reticulated textured growth surface 204; the latter preferably constructed of screen or netting, or the like. The textured growth surface providing a plurality of surface sites for maximal adhesion of algae, and constructed of nontoxic materials such as fiberglass, or polymers such as polyethylene, or polypropylene. When screen or netting is used to form a textured growth surface, the screen should preferably have a mesh size between 0.5 mm to 5 mm and have a strand thicknesses of between 0.1 mm and 1 mm. Larger mesh sizes are as effective if more than one layer is formed, for example by wrapping. Alternately, growth surfaces may be constructed of textured or roughened materials such as fibrous polymers, expanded clay, sintered glass, appropriately molded plastic or epoxy resin substrates, and the like. Preferably the growth surface should have sufficient surface texture to trap algal spores and allow algal adhesion strengths capable of withstanding the fluid flow rates preferred for use. Preferably, surface textures should have mean dimensions of approximately 0.1 to 3 mm, and a density of approximately $10-10^4$ surface features/cm$^2$ growth surface.

Although the surface area of the growth element may be further increased by forming macroscopic folds, depressions, or projections in the growth surface, the benefits of increased surface area are typically outweighed by increased shading (algae shading by other algae and surface structures) and reductions in nutrient transport Therefore, if desired macroscopic features for increasing the surface area of the growth element should preferably be limited to less that 0.5 cm in depth or height.

It is preferable to have the growth element and growth surface as separate components such that the growth surface can be easily replaced. The growth surface may also be composed of several units such that portions may be replaced individually. However, growth surface 204 may also be manufactured as part of growth element 202.

As illumination is surface area dependent, lower luminous intensities are required for illuminating small surfaces as compared to larger ones. Consequently, illumination restricted to the top surface of prolate growth element 202 requires many fold less luminous intensity than the large flat surfaces of the prior art, as does illumination restricted to a portion of an alternate rotating growth element. Further, the smaller surface area for illumination allows placing the bulb closer to the growth surface while still maintaining even distribution and high light intensities, thereby more efficiently utilizing the light source.

Growth element 202 is supported above the bottom of receptacle 108 by a drive shaft 206 and a free shaft 208. Free shaft 208 fits into a bearing seat 424 (best seen in FIG. 4C) of a free bearing 209. Preferably, free bearing 209 is molded as part of receptacle 108. The dimensions of the receptacle are constructed such that growth surface 204 of growth element 202 is at a distance from the walls and bottom of the filter receptacle to prevent compressing or scraping of living algae. Preferably, a distance of between 0.2 cm and 5 cm should be maintained. Also, preferably, the growth element is partially submerged within the water of the receptacle such that nutrients can be exchanged between the algae and the water. However, water may be sprayed or otherwise directed as to flow over the growth element Most preferably, the growth element is mounted such that it is completely submerged within water at depths of between approximately 0.2 cm and 5 cm below the water surface to prevent algae at the top of the growth element from protruding out of the water, and from 'matting' onto the growth element. Further, water turbulence over the top surface chaotically dishevels the algal filaments as they pass under the light, thereby increasing light distribution.

In general, the greater the water flow rates, the better the mass transport of pollutants to the algae. However, the typical flow rates currently used in conventional bacterial filters for aquaria, usually in the range of 100 to 2000 gallons per hour (depending on the size of the water body to be filtered), are sufficient for the photosynthetic filters and systems taught herein.

The water level within the receptacle is determined by the height of outlet port 112. Also, the height of an inlet port 210 is constructed at a higher elevation than the outlet port, but lower than the walls of receptacle 108, such that if the outlet port becomes clogged, water will flow around inlet A motor 212 supported an aquarium.

A motor 212 supported and protected from water moisture by a motor platform 214, rotates a worm shaft 216 (best seen in FIG. 3). A worm gear 218 (best seen in FIG. 3) translates vertical rotation provided by the motor into horizontal rotation of drive shaft 206, and subsequently of growth element 202, which is engaged with drive shaft 206. Worm gears allow large reductions in motor RPMs via a one step reduction. Other useful gear types include bevel gears, screw gears, and the like.

The use of the gear arrangement shown avoids the necessity of expensive and maintenance requiring water-proof or water resistant motors. However, water proof motors, including those motors currently used in water pumps and waterjets, may be used to directly connect the motor to the growth element, providing for modest reductions in size of the invention by reducing the number of gears and shaft length required.

As well as providing non-continuous illumination to photosynthetic organisms adhered to growth surface 204, rotation also increases the convective mass transport of nutrients to, and oxygen away from, the algae. Convection is directly enhanced by the movement of the growth element relative to the water, and indirectly by moving algae through the differing local flow/concentration environments within the receptacle. Changing convective currents across the algae cause disordered disheveling of the algae filaments thereby improving distribution of light and further improving nutrient transport Consequently, baffles are not required, although may be used, to promote turbulence.

In general, the faster the rotation of growth element 202, the better the convection, and the better the illumination of the growth element However, faster rotations may increase wear rates on mechanical parts and tend to wind the algal filaments around the growth element, thereby inhibiting mass transport and distribution of illumination. Larger growth elements are more prone to the winding of the algal filaments because the tangential velocity of algae at the surface is greater. Therefore, it is typically preferable to rotate growth elements having diameters larger than approximately 4 inches, at minimal RPMs for obtaining light-sufficient illumination.

The rotation rate of growth element 204 determines the intervals of the non-continuous illumination. Preferably the invention is operated wherein light-sufficient illumination is provided to the photosynthetic organisms, and thus maximal filtration is obtained. However, operation at photosynthesis-sufficient illumination levels allows the control of filtering rates and production of oxygen.

The rotation rates providing light-sufficient growth for virtually all algae types lie approximately between 1 and 30 RPM (i.e., periodic intense illumination and low illumination intervals of between 30 and 1 seconds, respectively) and are typically near 5 RPM (i.e., intervals of approximately 6 seconds). Preferable rotation rates for implementing this invention are between 1 and 7 RPM (i.e., ~30 and 4 seconds, respectively), and most preferably, between 3 an 10 RPM (i.e., intervals of between ~10 and 3 seconds, respectively). At greater intervals (slower RPMs), photosynthesis will become photosynthesis-sufficient and its rate directly controllable by the rotation rate. At intervals greater than approximately 5 to 30 minutes, photosynthesis will become significantly hindered and the algae will significantly convert to aerobic respiration.

Preferably, the intervals providing light-sufficient illumination are optimized in the a manufacturing design stage for a specific photosynthetic filter. This is simply accomplished by varying the revolution rate, i.e., intense and low illumination interval durations, and monitoring oxygen production, nutrient uptake, or biomass production. Oxygen gives a good measure of photosynthesis rate, and thus filtering rate, and is relatively easily determined in real time by the use of polarographic oxygen sensors placed in the receptacle inlet stream and exit stream. This procedure is best performed under non-limiting nutrient conditions. The algal oxygen production rate is determined as the difference between the inlet and exit oxygen concentrations multiplied by the flow rate. Further, the same method is performed to optimize and calibrate control of filtration, for a specific manufactured design, by exactly determining the filtering rate ($O_2$ production) versus the illumination interval ranges over which photosynthetic-sufficient illumination occurs. This procedure allows the optimization of a given design to maximize reductions in size, lighting requirements, heat production, and filtration control. However, this optimization is not necessary to obtain the significant benefits of the invention as taught herein.

If desired, polarographic electrodes can be built into the inlet and exit ports of the receptacle and in electrical communication with an integrated circuit which performs the optimization procedure automatically by changing the motor RPM and monitoring oxygen changes.

Growth element surface area, and thus overall size required for a particular application, depends on several primary parameters, including (a) the water volume to be filtered, (b) the number and size of aquatic animals (i.e., the bioload), (c) the desired level of water purity, and (d) the metabolic/growth rate of the algae; the latter depending on the rate of nutrient transport to the algae and the light level. For obtaining high water quality for home aquariums, growth-surface-area-to-aquarium-water-volume ratios should be preferably in the range of 0.5 to 7 $cm^2/L$, and most preferably in the range of 1 to 4 $cm^2/L$.

The preferred embodiment of FIG. 1 also provides means for controlling the flow profile within the receptacle. Referring to FIG. 2, baffles or fins 220 are preferably arranged perpendicular to the growth element, and preferably increase in length as their distance increases from a water inlet nozzle 222. This arrangement redirects water streams, normally flowing along the wall of receptacle 108, toward and across growth element 202. Similarly, water can be distributed over the growth element by flowing water through a tube or tubes running parallel to the growth element and having holes along the length of the tube on the side facing the growth element Even flow distribution is produced by increasing the size of the holes toward the downstream end of the tube. Likewise, the increasing size of the fins shown in FIG. 2 constricts the cross-sectional flow area thereby maintaining high flow velocities at the down stream side (right side) of the receptacle.

Nozzle 222 partially directs water 224 with the direction of rotation 226 of growth element 202 (see FIG. 2) to mitigate algal filament winding. Winding of algal filaments can also be mitigated by intermittent rotations of the growth element. However, modifying the direction and rate of water flow with the nozzle and fin arrangements, as shown in FIG. 2 is more simple and less expensive. Further, slots, similar to slots 324 (seen in FIG. 3), along the walls of the receptacle may be incorporated, allowing one to easily change the number and size of fins at each location.

Similarly, other surface features on the inside walls of the receptacle, such as divots, are useful for redirecting flow streams away from the walls of the receptacle toward the growth element. Optimum placement and dimensions of surface features are dependent on the dimensions of the receptacle, the number and size of growth elements, the flow rate of the pump, and direction of flow with respect to the axis of the growth surface, i.e., parallel or transverse. In general, it has been found that (a) small surface structures, such as divots and ridges or bumps (approximately $\leq 0.5$ cm), along the wall of the receptacle are effective for creating turbulence, increasing mixing, especially for receptacles having small lengths or when high flow rate pumps are used, (b) fins should be placed substantially perpendicular to the primary flow direction and extend no closer than approximately 0.2 cm to the growth element, so as not to scrape off or damage the growing algae, and (c) fins and baffles should not be placed so that they extend between the growth elements and the light source.

Optimum fin placement for the manufacturing design of a particular photosynthetic filter configuration is determined by the following procedure: first, a visualization medium such as air bubbles, particulates or dye is intermittently added to the water stream as it enters the receptacle. Heavy streams running parallel to the growth elements can be visualized by this method and fins placed across the path of these streams extending toward the growth elements, and preferentially angled to direct flow to areas of the growth elements having low flow. A primary goal of redirecting flow patterns is to induce a changing flow pattern near the growth element, producing chaotic or turbulent motions of attached algae. This increases distribution of light to the algae, mass transport of impurities to the algae for assimilation, and the transport of oxygen away from the algae.

Preferably, the present invention is constructed as to allow simple assembly, easy replacement of damaged parts, and simple removal and maintenance of growth element 202 without disturbing the rotational drive assembly. Referring to FIG. 3, a support body 300 is the supporting assembly structure for a drive assembly. Drive shaft 206 passes through an aperture in a drive bearing 302 and worm gear 218A snaps onto drive shaft notches 306. Drive bearing 302 loosely supports drive shaft 206 as to allow free rotation. Drive bearing 302 can be molded as part of support body 300 or snap fit into an aperture (not shown) in the support body.

Worm gear 218B engages worm gear 218A, as worm gear 218B is inserted up through the aperture in a stop plate 308 and a guide plate 310, and finally up against motor platform 214. Worm gear 218B is locked into place by sliding a clip 312 onto stop plate 308. A grooved motor shaft 314 freely passes through a motor platform aperture 316 and engages a grooved aperture 318 of worm gear 218B. Motor 212 locks onto the motor platform by snaps 320.

A cutout 322 (see FIG. 3) fits around nozzle 222 (best seen in FIG. 2A) when support body 300 is lowered into slots 324 on distal walls of receptacle 108. The proximity of receptacle wall 326 prevents movement of clip 312 and drive shaft 206. Lighthood 114 rests on a lighthood seat 328, forming a removable lid for receptacle 108.

Growth element 202 is preferably substantially hollow as to allow water flow behind the growth surface and to reduce the amount of material required in its manufacture. Water flow behind the growth surface improves nutrient transport to growing algae. Referring to FIG. 4, preferably, growth element 202 is comprised of a skeletal mesh support frame 400 having solid braces 402L and 402R, at its ends. The hollow open design also makes it possible to form an Archimedes screw (not shown) down the center of the growth element, as part of the support frame. The rotation of the growth element would therefore induce increased water flow through the growth element. Alternately, water flow directed through the growth element would thereby rotate the growth element.

The support frame is preferably constructed as a single piece of plastic for strength and simplicity of manufacture. A set of spokes 404 of a drive hub 406 slide snugly into slots 408 of Brace 402L and spokes 410 of a free hub 412 slide snugly into slots (not shown, same as slots 408) of brace 402R. Drive hub 406 having an internally splined aperture 414 for, easily and without strict alignment requirements, engaging drive head 330 (best seen in FIG. 3). A screen material (not shown) is preferably preformed into a cylindrical shape as to slide snugly over support frame 400. This screen provides textured growth surface 204. Screen material may alternately be wrapped around support frame 400 and tightly held in contact with support frame 400 by clips or bands. Alternately, growth surface 204 can be formed as part of support frame 400.

As shown in FIG. 4B, free shaft 208 is springably connected to free hub 412, such that axial pressure on free shaft 208 depresses a spring 416 allowing free shaft 218 to recede into free hub 412. Spring 416 is preferably made of a nontoxic plastic or a non-corroding metal such as stainless steel. A stop 418 maintains spring 416 and free shaft 218 within free hub 412 when the spring is in its elongated state. Free hub 412 is assembled by inserting free shaft 208 and spring 416 through a hub aperture 420. Aperture 420 is threadably closed with a plug 422. Referring to FIG. 4C, free shaft 208 fits into an aperture 424 of free bearing 209. Aperture 424 is sized to loosely support free shaft 208 as to allow free rotation of the shaft therein.

The exemplified embodiment taught in FIGS. 1–4C, allows for the easy assembly of the photosynthetic filter, and the simple removal and reinstallation of the growth element within supports or a receptacle having longitudinal dimensions only slightly larger than the growth element. Further, removal of the growth element is allowed without disassembly of the rotational drive components. Referring to FIG. 2, the growth element is removed by grasping it and applying pressure toward free bearing 209. This compresses free hub spring 416 (shown in FIG. 4B), thereby collapsing free shaft 208. The shortening of free shaft 208 allows growth element 202 to move toward free bearing 209, thereby disengaging it from drive shaft 206. Growth element 202 can then be removed from the receptacle 108 for maintenance.

However, it should be understood that there exist a variety of other satisfactory methods for providing rotation to the growth element and for demountably securing the growth element within the receptacle. Further, a variety of methods exist for providing the taught non-continuous illumination to adherent photosynthetic organisms for reducing the size, and costs of photosynthetic filters. Accordingly, the scope of the present invention should not be limited by those methods expressly described herein.

In an alternate embodiment, illustrated in FIG. 5A, a splined drive head is formed with a single spline 500 for engaging splined aperture 414 of drive hub 406 (illustrated in FIG. 5B). An open spline 502 allows splined drive head 416 to engage splined aperture 414 at virtually all angles.

Figure 6A:
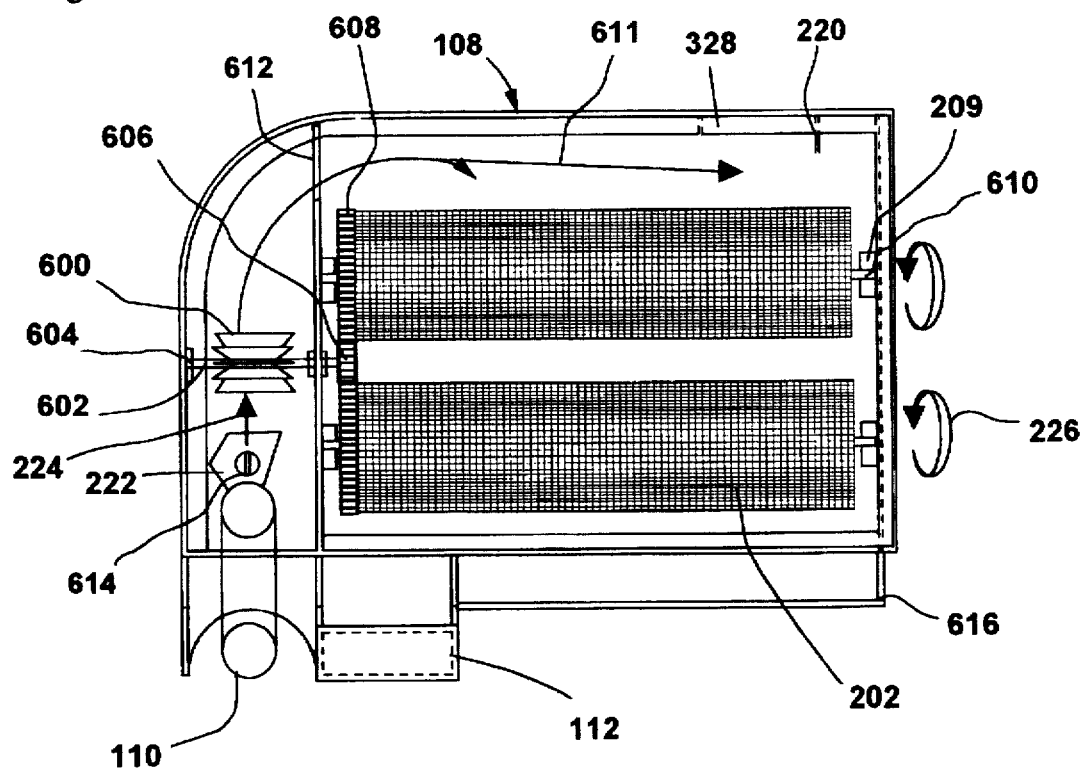
FIG. 6A is a top plan view, with lighthood portion removed, of an alternate preferred embodiment of a photosynthetic filter of the present invention in which rotation of a growth element is powered by water flow impinging on a paddle or turbine.

In an alternate embodiment, illustrated in FIG. 6A, power for rotation of the growth element is supplied by moving water impinging on a paddle or turbine 600. A paddle shaft 602 fits into bearings 604 molded into receptacle 108. Rotation of paddle shaft 602 rotates a drive gear 606 connected to the end of the paddle shaft. Rotation of drive gear 606 rotates alternate growth elements 202 having growth element gears 608 (best seen in FIG. 6B). Growth elements 202 are pivotably supported by free shafts 610 which seat into free bearings 209. Preferably, free bearings 209 are molded into receptacle 108.

Figure 6B:
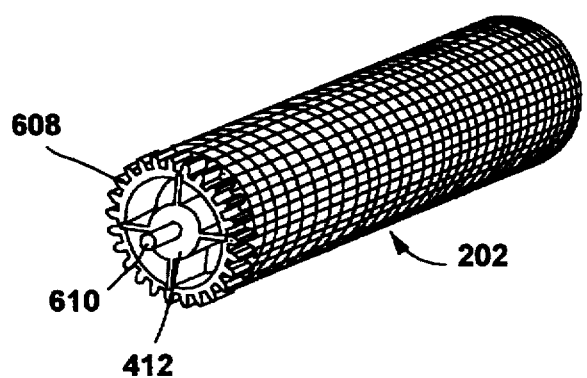
FIG. 6B is a perspective view of a growth element of the photosynthetic filter of FIG. 6A.

Water flow 611, upon moving paddle 600, is directed through a lower internal receptacle aperture 612, suffuses growth elements 202, and returns to the aquarium via outlet port 112. Referring to FIG. 6B, preferably, alternate growth element 202 has gear 608 molded into support frame 400 or, molded as part of an alternate free hub 412 having a rigid free shaft 610 (as can be seen in FIG. 6B), and not springably attached as with free shaft 208 (seen in FIG. 4A). Receptacle 108 includes a lip 616 for mounting the receptacle on the side of aquarium 104.

The rotation rate of paddle 600 is determined by the impinging water flow 224. The rotation rate of growth elements 202 are determined by the rotation rate of paddle 600 and the reduction ratio of drive gear 606 and growth element gear 608. Preferably, the rotation rate of the growth elements are determined by selecting a gear reduction ratio providing the desired RPMs. Adjustments are performed by the user if desired by regulating a by-pass valve 614 for directing water flow to bypass paddle 600. Further, water flow to the photosynthetic filter can be regulated by a valve outside the receptacle or by electrically controlling the water flow delivered by the pump. Automatic regulation of rotation rates may be performed by monitoring the rotation rate of the growth elements by electromechanical means and incorporating an integrated circuit (not shown) to control the electrical power delivered to the pump or preferably the opening and closing of paddle by-pass valve 614.

Similarly, the filtering rate may be controlled to optimum or desired sub-optimum levels by incorporating polarographic electrodes for monitoring, on demand, the oxygen production rate of the filter. An integrated circuit is then used to control algal filtering at desired levels by controlling the rotation of the growth element. Similarly, other sensors, such $CO_2$ sensors are useful for monitoring the metabolic rate of the algae within the filter and thus can be utilized as monitors for providing feedback control of growth element rotation rates.

Figure 7:
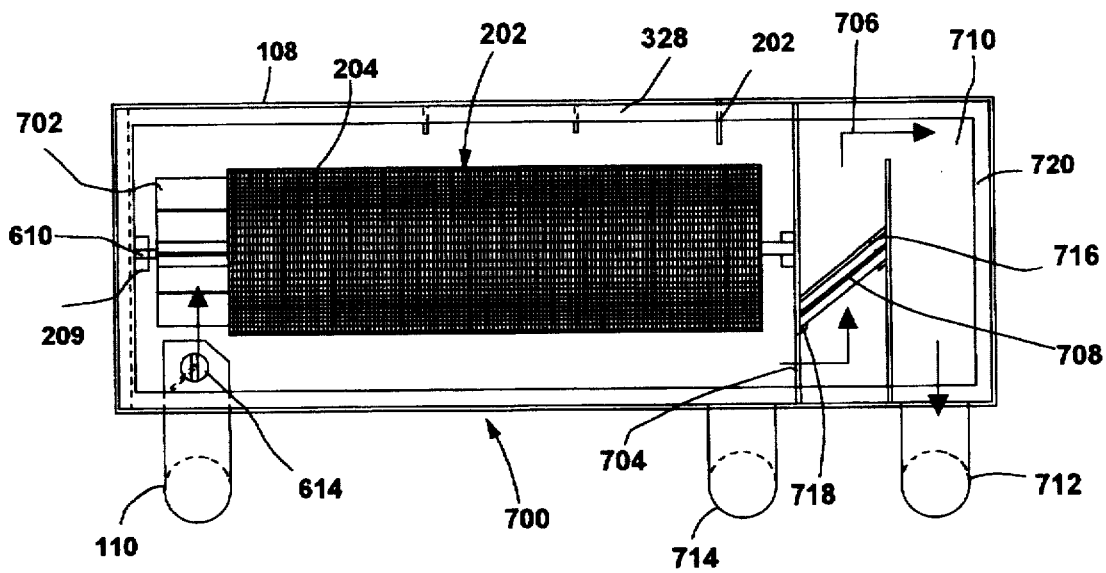
FIG. 7 is a top plan view, with lighthood removed, of a photosynthetic filter system having a photosynthetic filter of an alternate preferred embodiment of the present invention, wherein a paddle or turbine is combined as part of a growth element.

In an alternate embodiment, illustrated in FIG. 7, a photosynthetic filtration system 700, for mounting on top of an aquarium, utilizes an alternate growth element 202 comprised of a reticulated growth surface 204 and a paddle or turbine 702. Water 224 is pumped from an aquarium to receptacle 108 via inlet tube 110. The non-continuous illumination of the growth surface 204 is produced by rotation of growth element 202 produced by water flow impinging on paddle portion 702. Rotation rate, and thus the non-continuous illumination intervals, are controlled by regulating the water flow impinging on the paddle by valve 614. Water flow suffuses growth element 202 and exits receptacle 108 via a wall aperture 704. Water 706 then passes through a mechanical filter cartridge 708, enters an aerobic bacterial chamber 710, and exits the top mounted filtration system via an outlet tube 712. A water overflow tube 714 is at a height sufficiently above outlet tube 712, and sufficiently below the walls of receptacle 108, such that if a blockage occurs in mechanical filter 708, bacterial chamber 710, or outlet tube 712, then water will return to the aquarium instead of flowing over the walls of the receptacle. Mechanical filter 708 is retained in a channel formed between a screen plate 716 and retaining lips 718. Mechanical filter 708 is composed of a matrix of fiberglass, cotton, or polymer material for trapping particulates and thereby preventing particulates from clogging bacteria filter chamber 710 and/or returning to the aquarium. Bacterial chamber 710 is maintained as a dark environment and is filled with a solid substrate material providing a high surface area for bacterial growth. Preferred materials include gravel, sintered glass, expanded clay, or plastic.

The lighthood rests on lighthood seat 328, forming a top for, and providing light for receptacle 108. A separate lid (not shown) rests on a lid seat 720. Separate removable tops for the photosynthetic and bacterial filters are preferably provided as to allow simple and separate maintenance of each filter.

An alternate photosynthetic filter embodiment for mounting within an aquarium tank is illustrated in FIG. 8. Growth element 202, of FIGS. 2A, 3, and 4, is supported within alternate embodiment of receptacle 108. Receptacle 108 is submerged into the water of aquarium 104 so that outlet port 112 remains approximately 0.5 inches above the aquarium water line. This height is controlled by mounting a set of floats 800 onto receptacle 108. Horizontal support is provided by positioning a plate 802 having dowels 804 projecting through it. Outside perimeter of positioning plate 802 rests on a lip edge 803 of aquarium 104, and may be a portion of a cover extending over the entire aquarium. Dowels 804 loosely fit into a corresponding set of retaining rings 806 mounted onto the receptacle, thereby allowing vertical movement of the receptacle with changes of water levels within the aquarium. Alternately, instead of dowels, plate 802 may have vertical plates extending down from an access hole 808 and fitting around the perimeter of receptacle 108. In this latter embodiment, retaining rings 806 are not required, and a gap will not form between the positioning plate 802 and the receptacle when aquarium water is low.

Referring again to FIG. 8, positioning plate 802 has a small aperture 810 through which splined motor shaft 314 engages worm gear 218A. An elongated internally splined recess 812 in worm gear 218A maintains coupling under changes in aquarium water heights. Alignment of the lighthood with the receptacle is maintained by apertures 814 sized to loosely fit around dowels 804 of the positioning plate, allowing easy engagement and disengagement of the lighthood from the positioning plate.

Figure 9:
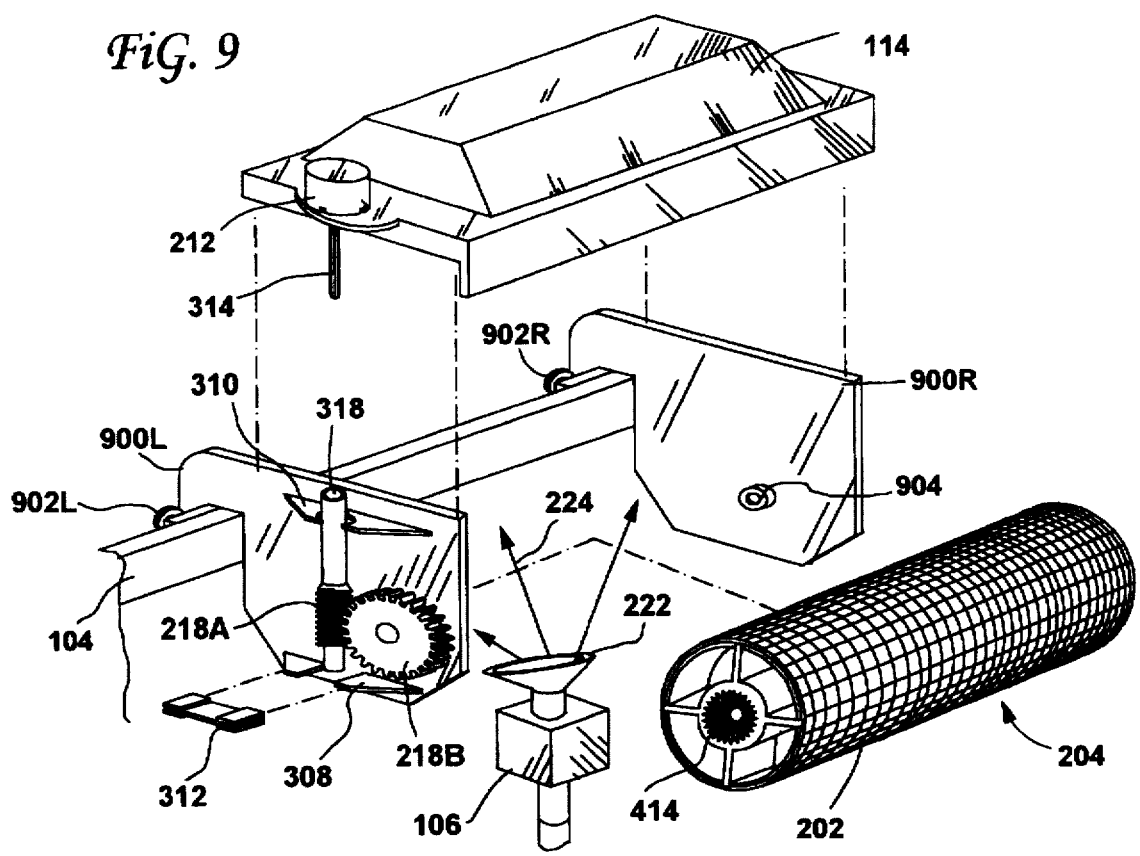
FIG. 9 is a partially exploded perspective view of a photosynthetic filter in accordance with another embodiment of the invention wherein an aquarium forms a receptacle.

An alternate Photosynthetic filter embodiment incorporating an aquarium as a receptacle 108 is illustrated in FIG. 9. Alternate growth element 202 is supported on a side of aquarium 104 by a left support body 900L and a right support body 900R. The support bodies are demountably secured in place by clamp bolts 902L and 902R. Alternate growth element 202 is preferably installed between support bodies 900L and 900R by (a) securing support body 900L to the tank, (b) engaging splined recess 414 with splined drive head 416 (seen in FIG. 3), (c) moving support body 900R toward support body 900L and engaging a free bearing aperture 904 with free shaft 610 (best seen in FIG. 6A) of growth element 202, and (d) securing support body 900R to aquarium 104 by tightening clamp bolt 902R. Preferably, a pump 106, such as a water jet, is used to suffuse the growth element with water. However, an advantage of this embodiment is that a pump is not required to produce convection to the growth element as the rotation of the growth element produces convection and turbulent algae movement as they are rotated through the differing convective currents existing within the aquarium.

Figure 10A:
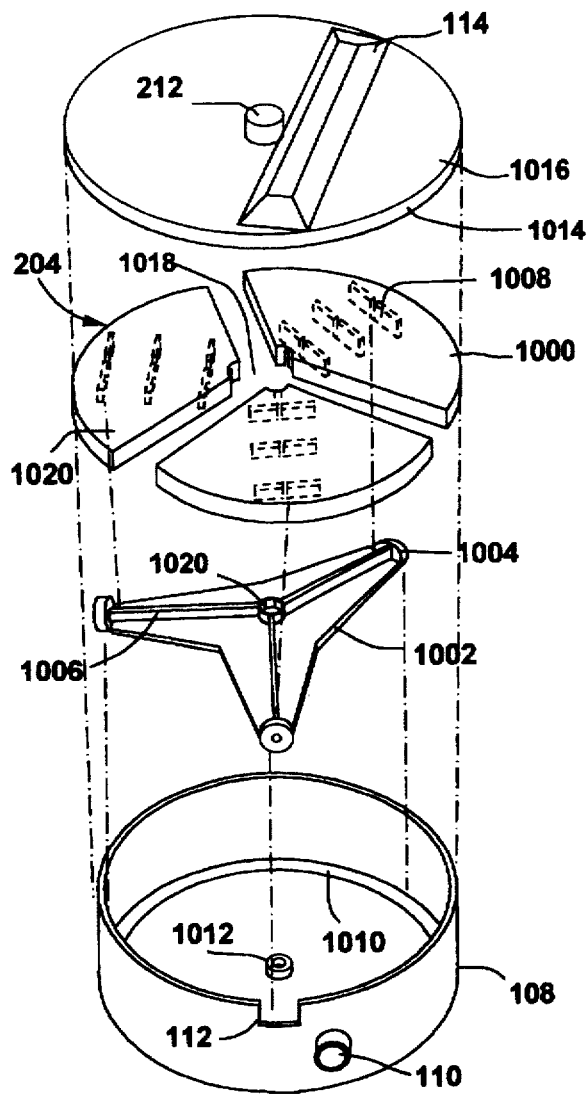
FIG. 10A is a partially exploded perspective view of a photosynthetic filter in accordance with another preferred embodiment of the invention having a rotating disk growth element.

An alternate photosynthetic filter embodiment having an alternate rotating disk growth element 202 is illustrated in FIG. 10A. Growth element 202 is comprised of growth element modules 1000. Growth element modules 1000 are supported by a rotating support body 1002 having rotationally mounted wheel bearings 1004, and ridges 1006. Braces 1008 on the bottom of growth element modules 1000 straddle ridges 1006 of rotating support body 1002 so that rotation of the rotating support body induces rotation of the growth element. Alternately, growth element modules 1000 and support body 1002 may be manufactured as one component.

Rotating support body 1002 rests pivotably in the bottom of receptacle 108. Wheel bearings 1004 of rotating support body 1002 rest in circular wheel bearing recess 1010. Further, free shaft (not shown) on the center bottom of rotating support body 1002 engages a shaft bearing recess 1012. Receptacle lid 1016 is demountably secured to receptacle 108 by a lip 1014. Grooved motor shaft 314 (best seen in FIG. 3) extends from motor 212 through a growth element aperture 1018, and engages rotating support body 1002 via a splined recess 1020. Lighthood 114 forming a portion of lid 1016 and preferably illuminating at any instant in time, 20%–80% of the growth element, and most preferably 30%–50%. The percent illumination controls whether the intense and low illumination intervals are equal (i.e., an instantaneous illuminated fraction of 50%), the low illumination interval is longer (i.e., instantaneously illuminated fractions <50%), or the intense illumination interval is longer (i.e., instantaneously illuminated fractions >50%).

Figure 10B:
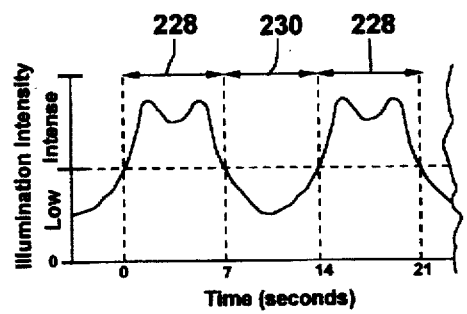
FIG. 10B is a graph showing a preferred non-continuous illumination profile provided by the embodiment of FIG. 10A.

Rotation of growth element 204, having growth surface 202, under lighthood 114 provides non-continuous illumination of the growth surface. The preferred rotation rates, providing light-sufficient illumination, of rotating disk embodiments and other shapes are as previously described for prolate growth elements. FIG. 10B exemplifies a portion of a preferred non-continuous illumination profile experienced by a photosynthetic organism near the outer region of the rotating disk growth element of FIG. 10A. The exemplified non-continuous illumination of the photosynthetic organism is comprised of alternating intervals, of seven second intense illumination intervals 228, over which illumination intensity is between 50 µeinsteins/$m^2$-sec to 2000 µeinsteins/$m^2$-sec, and seven second low illumination intervals 230, over which illumination intensity is between approximately 25% and 50% of the peak illumination value of the intense illumination interval.

As the diameters of rotating disks are typically greater than those of prolate growth elements (for maintaining the same surface areas), there is a greater tendency for algal filaments to lay over, aligned opposite to the direction of rotation. This tendency is alleviated by preferably angling inlet port 110 as to provide water flow substantially with the direction of rotation.

Figure 11A:
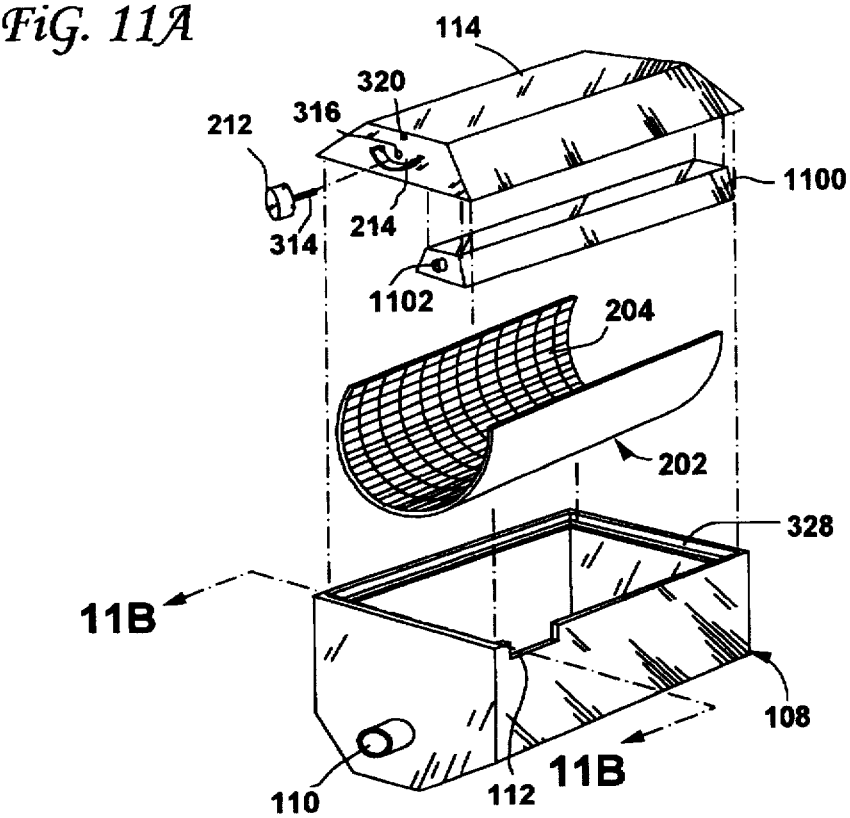
FIG. 11A is a partially exploded perspective view of a photosynthetic filter in accordance with another preferred embodiment of the invention having a pivoting light source.

An alternate photosynthetic filter embodiment having a moving light source is illustrated in FIG. 11A. Non-continuous illumination of an elongated semi-cylindrical growth element 202 is provided by sweeping light to and fro (seen best in FIG. 11B) across growth surface 204. Light is swept by the to and fro pivoting of a light lens 1100 by reversible motor 212. Light lens 1100 is pivotably mounted within lighthood 114. Motor shaft 314 engages light lens 1100 via motor platform aperture 316. Growth element 202 is preferably shaped with an arc such that its distance from the light source is nearly constant over the revolution range of the light lens. However, light can also be swept across a substantially flat growth element.

Preferably, rotation of light lens 1100 is provided such that the time interval for the light beam to sweep from one side of growth element 202 to the other and back provides the low intensity illumination intervals as previously described (i.e., approximately 1 to 30 seconds, and most preferably between 3 to 10 seconds). The intense illumination intervals are preferably provided at ⅕ to ⅒ of the low intensity illumination intervals for pivoting light source embodiments.

Figure 11B:
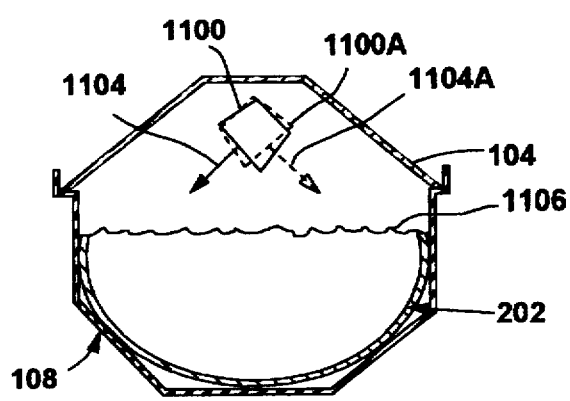
FIG. 11B is a sectional view of the photosynthetic filter of FIG. 11A.
Figure 11C:
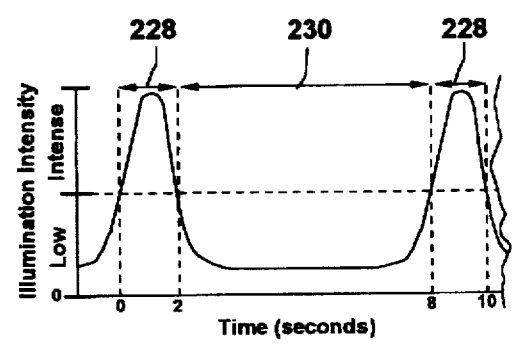
FIG. 11C is a graph showing a preferred non-continuous illumination profile provided by the embodiment of FIGS. 11A and 11B.

Referring to FIG. 11B, light lens 1100 rotates from its position 1100 to alternate position 1100A, such that a light beam 1104 moves from its initial direction to an alternate direction 1104A. Preferably, receptacle 108 is filled with water to a level 1106. Turbulence is induced within the receptacle by arranging the outlet port 112 near the inlet tube 110, such that the water must reverse flow direction to exit the receptacle. Alternately, turbulence may be induced by impinging water flows from multiple inlets. For example, water inlets placed at opposite ends of the receptacle and impinging near its center, induce intense turbulence. FIG. 11C exemplifies a portion of a representative non-continuous illumination profile experienced by a photosynthetic organism on the surface, near the top edge, of the static growth element of FIG. 11A. The exemplified non-continuous illumination of the photosynthetic organism is comprised of alternating intervals including, two second intense illumination intervals 228, over which illumination intensity is between 50 μeinsteins/$m^2$-sec to 2000 μeinsteins/$m^2$-sec, and six second low intensity intervals 230, over which illumination intensity is between approximately 20% and 50% of the peak illumination value of the intense illumination interval.

In a preferred embodiment of FIG. 11A a light source is mounted within light lens 1100. Electrical wiring to the light source is provided at a length such that rotation of the light lens does not strain the wiring. Alternately, the light lens may be mounted such that it moves independently of the light source, the latter being demountably fixed to lighthood 114.

In an alternate embodiment (not shown) a focused light source may be rotated over a static disk shaped growth element similar to that shown in FIG. 10A. Referring to FIG. 10A, a light source pivotably mounted radially on the bottom of the receptacle lid would sweep the growth element as it was rotated. To prevent winding of the light source wiring, rotating electrical contact such as those currently used in common appliances such as phone cords and vacuum cleaners, are employed.

Figure 12:
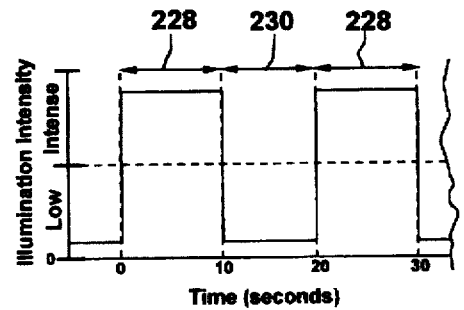
FIG. 12 is a graph showing a preferred non-continuous illumination profile provided by another preferred embodiment of the invention having a non-continuously powered light source.

In an alternate embodiment, a non-continuously powered light source is employed for providing non-continuous light-sufficient illumination to a static growth element, thereby significantly reducing the energy usage and heat production of the light source. The low intensity illumination period is preferably of the intervals previously described (i.e., approximately 1 to 30 seconds, and most preferably 3 to 10 seconds). The preferred illuminations for the intense and low illumination intervals are as previously described. Preferably, the intense illumination interval is approximately 10% to 100% of the low intensity interval, and most preferably between 20% and 100% of the low intensity interval duration. (note that a value of 100% indicates that the intervals are equal, and corresponds to a 50% instantaneous illuminated surface fraction for the rotating growth element embodiments described). FIG. 12 exemplifies a portion of a representative non-continuous illumination profile experienced by a photosynthetic organism on the surface of a static growth element illuminated by a non-continuously powered light source. Although, non-continuous powering of a light source may produce many different profiles of non-continuous illumination, including the preferred non-continuous illumination profiles exemplified in FIGS. 2B, 2C, 10A, and 11C, a preferred square wave illumination is exemplified in FIG. 12. The exemplified non-continuous illumination of the photosynthetic organism is comprised of alternating ten second intense illumination intervals 228, over which illumination intensity is between 50 μeinsteins/$m^2$-sec to 2000 μeinsteins/$m^2$-sec, and ten second low intensity intervals 230, over which illumination intensity is between approximately 10% and 50% of peak high intensity.

Figure 14:
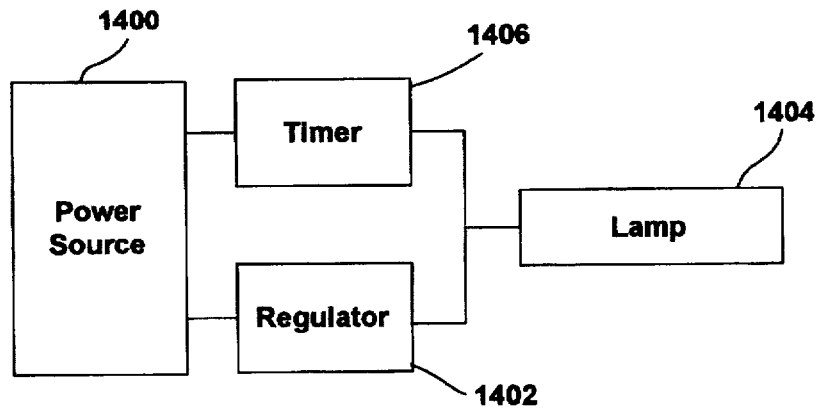
FIG. 14 is a block diagram of a circuit for non-continuously powering a light source in accordance with a preferred embodiment of the invention.

A circuit for non-continuously powering an electric lamp is exemplified in FIG. 14. Power is supplied by an electrical power source 1400. A regulator 1402 provides a low intensity power level to lamp 1404. A timer 1406 is also connected to lamp 1404, in parallel with regulator 1402. Timer 1406 intermittently delivers added power to the lamp to provide a high intensity interval. The intervals of low and high intensity are predetermined by the timer.

The photosynthetic filters taught herein can be used alone or in combination with other mechanical, chemical, and bacterial water filtration devices. It becomes increasingly beneficial to combine the filter taught herein with bacterial filters and mechanical filters as increasingly greater animal bioloads are maintained within an aquarium, or increasingly better water quality is desired. The use of these filters together often increases their performance beyond the sum of their individual filtering capacities.

Figure 13:
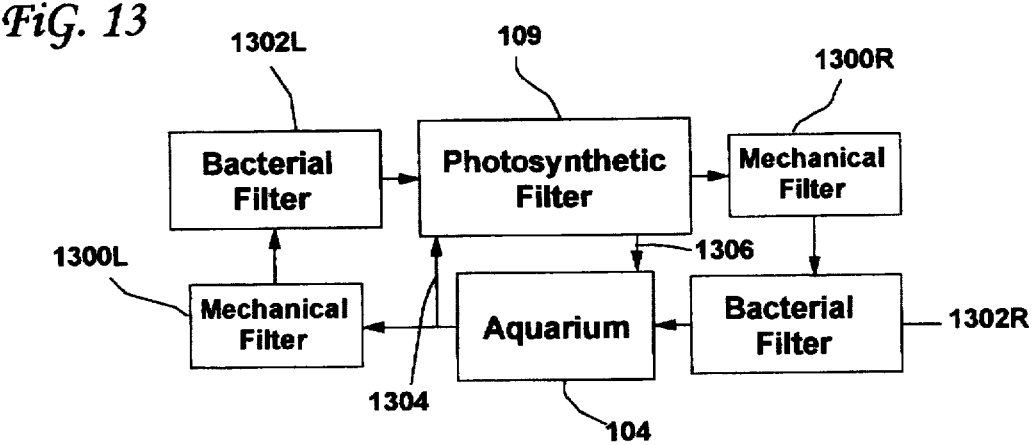
FIG. 13 is a flow chart of an alternate preferred arrangement of a photosynthetic filtering system in accordance with the invention.

As such, the photosynthetic filters taught herein may be incorporated into filtering systems as illustrated in FIGS. 1, 7, and 13. Referring to FIG. 13, photosynthetic filters are preferably mounted such that they are sandwich between two mechanical/bacterial filters. Water from aquarium 104 passes via a mechanical filter 1300L to an aerobic bacterial filter 1302L. Mechanical filter 1300L removes particulates from the water stream allowing optimum performance and lower maintenance for the bacterial filters. Preferably, mechanical filters 1302 are in module or cartridge form as to allow easy replacement.

Organics and nitrogenous compounds are aerobically metabolized by bacteria in bacterial filter 1302L to $CO_2$, ammonia, nitrate, and nitrates among others. Water then passes to photosynthetic filter 109 where these substances are removed by algae photosynthesis and the water is reoxygenated, often to supersaturation levels. The increased levels of $CO_2$ provided by the bacterial filter enhance photosynthetic filtering and oxygen production. Alternately, $CO_2$ can be added to the water prior to it entering or upon entering the receptacle, for enhancing filtration by the photosynthetic filter.

Preferably, an alternate conduit 1304 is provided for water flow to the photosynthetic filter if the mechanical or aerobic bacterial filters become clogged. Alternately, an undergravel filter, which functions as a mechanical/bacterial filter combination, may be used as it is very resistant to complete clogging.

Water enriched with oxygen from photosynthetic filter 109 passes through mechanical filter 1300R, and flows to bacterial filter 1302R. The oxygenated water from the photosynthetic filter fosters the growth of aerobic bacterial of bacterial filter 1302R, enhancing the removal of yet more organics and nitrogenous compounds. Further, oxygen concentrations are reduced to below saturation levels, as preferred by most fish. Preferably, an alternate conduit 1306, such as overflow tube 712 (seen in FIG. 7), is provided to allow water flow from the photosynthetic filter to return to the aquarium should flow through mechanical filter 1300R or bacterial filter 1304R be inhibited.

Algae growing on the growth element 202 assimilates pollutants from the water. Algal growth is periodically harvested to remove pollutant mass from the ecosystem, and to stimulate new algal growth. The period of harvesting depends on the growth rate of the algae, and thus the nutrient levels within the water, and the light intensity. As a rule of thumb, the algae should be harvested when the mat density increases such that the mat can not be properly agitated or illuminated. Most typically this will occur within one month. Algae is preferably harvested by removing growth element 202 and scraping a harvesting tool over and down the growth surface. Alternately, harvesting may be accomplished by replacing all or a portion of growth surface 204. Preferably, not all of the algae is scraped off or replaced at one time so that algae remain to maintain filtering capacity of the filter. Embodiments having multiple growth elements or growth element modules allow alternating the cleaning, or replacement of growth elements or growth surfaces.

Conclusions, Ramifications, and Scope of Invention

The photosynthetic filters taught herein deliver noncontinuous, photosynthesis-sufficient illumination to photosynthetic organisms adhered to a growth surface, and most preferably light-sufficient illumination is delivered. Non-continuous, light-sufficient illumination may be provided by rotating a growth element, moving a light source, or by non-continuously powering a light source. The photosynthetic filters and systems taught herein provide several substantial advantages over those taught heretofore, including significant reductions in dimensions, significant increases in filtering surface area, significant reductions in numbers and sizes of the lights required, significant reductions in electrical power consumed and heat produced by the lights, and significant improvements to nutrient and light distribution to the photosynthetic organisms.

More specifically, the embodiments taught herein incorporating rotating prolate growth elements allow greater than approximately 66% reductions in filter dimensions, and approximately 66%–80% reductions in lighting size, power requirements, and heat generation, as compared to photosynthetic aquarium filters taught heretofore, having approximately the same growth surface areas. Similarly, the embodiments taught herein having a moving light source or rotating disk growth element reduce the lighting required by as much as 66%–80%, and power consumption and heat production by approximately the same amount. And finally, embodiments taught herein having a non-continuously powered light source can reduce energy consumption and heat generation by approximately 20% to 50%.

Additionally, the Applicant teaches the controlling and/or optimizing of filtering rates by regulating the non-continuous illumination delivered. Those in the art will also appreciate that several accessories may be incorporated with the photosynthetic filters taught herein to automate function or to monitor the operational parameters of the filter. As examples, lighting timers and dimmers may be used to automate the light source, and audible or visible alarms may be incorporated for indicating failure of moving or lighting components, or reductions in water flow that may indicate clogging.

Also, the photosynthetic filters and systems taught herein have great flexibility in their mountability to an aquarium and may be mounted onto the back, top, side, or beneath an aquarium, or within an aquarium. Additionally, the photosynthetic filters taught herein may be used as a sole means of filtration or used in combination with other filtering mechanisms for enhanced performance. Other filter types may be manufactured as structural components of a photosynthetic filter system or attached separately. Finally, this invention taught herein provides a new, user-friendly, compact and efficient method for growing photosynthetic organisms for a variety of purposes.

The detailed description of the invention is set forth only for illustrating examples of the invention and should not be considered to limit the scope thereof in any way. Clearly, numerous additions, substitutions, and other modifications can be made to the invention without departing from the scope of the invention which is defined in the appended claims and equivalents thereof.

I claim:

1. A photosynthetic filter for purifying and adding oxygen to water including:
   a. a receptacle containing a volume of said water,
   b. a growth element mounted within said receptacle and having a growth surface of sufficient texture to accommodate adhesion of photosynthetic organisms,
   c. a non-continuous illumination means providing photosynthetic-sufficient illumination of said photosynthetic organisms; said non-continuous illumination having,
      i. predetermined intervals of substantially high intensity illumination, and
      ii. predetermined intervals of substantially low intensity illumination,
   whereby said photosynthetic filter is miniaturized or its energy consumption reduced.

2. The photosynthetic filter of claim 1 wherein said receptacle is an aquarium.

3. The photosynthetic filter of claim 2 wherein said intermittent illumination means includes:
   a. said growth element rotatably mounted to said receptacle and coupled to a rotational energy means, and
   b. a light source positioned as to intensely illuminate a portion of said growth element,
   whereby rotation of said growth element alternately exposes portions of said growth surface of said growth element to said intense illumination or enhances nutrient transport to said photosynthetic organisms.

4. The photosynthetic filter of claim 3 wherein said growth element is
   i. substantially cylindrical in shape,
   ii. demountably coupled with said receptacle and demountably coupled with said rotational energy means, and said rotational energy means is a turbine.

5. The photosynthetic filter of claim 3 wherein said growth element is
   i. substantially disk shaped, and
   ii. demountably coupled with said receptacle and demountably coupled with said rotational energy means, and said rotational energy means is a motor.

6. The photosynthetic filter of claim 4 further including a pump for suffusing said growth element with flow of said water.

7. The photosynthetic filter of claim 5 further including a pump for suffusing said growth element with flow of said water.

8. The photosynthetic filter of claim 3 wherein the level of said water within said receptacle and the mounting height of said growth element are predetermined as to submerge said growth element within said water.

9. The photosynthetic filter of claim 8 wherein said growth element is substantially cylindrical, and said rotational energy means is a motor.

10. The photosynthetic filter of claim 9 further including a pump for suffusing said growth element with said water.

11. The photosynthetic filter of claim 10 further including a nozzle for directing said flow of said water substantially toward said growth element and substantially with the direction of rotation of said growth element.

12. The photosynthetic filter of claim 1 wherein said receptacle has an inlet port and an outlet port, and a pump is included for circulating said water between said receptacle and an aquarium.

13. The photosynthetic filter of claim 12 wherein said non-continuous illumination means includes:
 a. said growth element rotatably mounted to said receptacle and coupled to a rotational energy means, and
 b. a light source positioned as to intensely illuminate a portion of said growth element,
 whereby rotation of said growth element alternately exposes portions of said growth surface of said growth element to said intense illumination or enhances nutrient transport to said photosynthetic organisms.

14. The photosynthetic filter of claim 13 wherein
 i. said growth element is substantially cylindrical, demountably coupled with said receptacle and demountably coupled with said rotational energy means,
 ii. said rotational energy means is a motor, and
 iii. said pump suffuses said growth element with said water.

15. The photosynthetic filter of claim 14 wherein the level of said water within said receptacle and the mounting height of said growth element are predetermined as to substantially submerge said growth element within said water.

16. The photosynthetic filter of claim 1 wherein said non-continuous illumination means includes:
 a. a light source mounted to said receptacle for intensely illuminating a portion of said growth element,
 b. a light lens pivotably mounted on said receptacle for substantially focusing and directing light of said light source onto said portion of said growth element, and
 c. a rotational energy means coupled to said light lens,
 whereby to and fro pivoting of said light lens over a predetermined angle, sweeps said intense illumination back and forth across said growth surface of said growth element.

17. The photosynthetic filter of claim 16 wherein
 i. said receptacle has an inlet port and an outlet port,
 ii. said growth element is a substantially semi-cylindrical member having paralleled opposed major faces, upper face of said member being said growth surface, and
 iii. a pump is included for circulating said water, between said receptacle and an aquarium, and suffusing said growth element with flow of said water.

18. The photosynthetic filter of claim 16 wherein
 i. said receptacle has an inlet port and an outlet port,
 ii. said growth element is a substantially planar member having paralleled opposed major faces, upper face of said member being said growth surface, and
 iii. a pump is included for circulating said water, between said receptacle and an aquarium, and suffusing said growth element with flow of said water.

19. The photosynthetic filter of claim 1 wherein said non-continuous illumination means includes:
 a. a light source rotatably mounted to said receptacle for intensely illuminating a portion of said growth element, and
 b. a rotational energy means coupled to said light source,
 whereby rotation of said light source adjacent said growth surface sweeps intense illumination over said growth surface of said growth element.

20. The photosynthetic filter of claim 19 wherein:
 i. said receptacle further includes an inlet port, an outlet port, and a pump for circulating said water between said receptacle and an aquarium, and
 ii. said growth element is a substantially disk-shaped member having paralleled opposed major faces, upper face of said member being said growth surface, and
 iii. said pump suffuses said growth element with flow of said water.

21. The photosynthetic filter of claim 1 wherein said non-continuous illumination means includes:
 a. a light source for illuminating said growth element, and
 b. a circuit means for non-continuously powering said light source,
 whereby less energy is required for operating said light source.

22. The photosynthetic filter of claim 21 wherein said growth element is a substantially planar member having paralleled opposed major faces, upper face of said planar member being said growth surface; and further including a pumping means for suffusing said growth element with flow of said water.

23. A method of removing nutrients and pollutants from water and adding oxygen including the steps of:
 a. providing a rotatably mounted growth element having adhered photosynthetic organisms,
 b. contacting said growth element with said water, and
 c. positioning a light source as to intensely illuminate a portion of said growth surface of said growth element, and rotating said growth element as to alternately expose photosynthetic organisms to said intense illumination,
 whereby photosynthetic organisms on said growth element are non-continuously illuminated and convective mass transport of pollutants and oxygen are enhanced.

24. A method of removing nutrients and pollutants from water and adding oxygen including the steps of:
 a. providing a growth element having adhered photosynthetic organisms,
 b. contacting said growth element with said water, and
 c. providing a light source as to intensely illuminate a portion of said growth element, and
 d. directing said light source as to sweep said intense illumination at predetermined rates over said growth element,
 whereby photosynthetic organisms on said growth element are non-continuously illuminated.

* * * * *